US006841232B2

(12) United States Patent
Tagge et al.

(10) Patent No.: US 6,841,232 B2
(45) Date of Patent: Jan. 11, 2005

(54) REINFORCED WALLBOARD

(75) Inventors: Christopher D. Tagge, San Carlos, CA (US); Jacob Freas Pollock, Berkeley, CA (US); Lennard Torres, Pleasanton, CA (US); David S. Soane, Piedmont, CA (US)

(73) Assignee: Innovative Construction and Building Materials, Emeryville, CA (US)

( * ) Notice: Subject to any disclaimer, the term of this patent is extended or adjusted under 35 U.S.C. 154(b) by 128 days.

(21) Appl. No.: 10/351,675

(22) Filed: Jan. 23, 2003

(65) Prior Publication Data

US 2004/0092624 A1 May 13, 2004

Related U.S. Application Data

(60) Provisional application No. 60/425,924, filed on Nov. 12, 2002.

(51) Int. Cl.$^7$ .................................................. B32B 3/26
(52) U.S. Cl. ............................... 428/304.4; 428/312.8; 428/328; 106/638
(58) Field of Search ........................... 428/304.4, 312.8, 428/328; 106/638

(56) References Cited

U.S. PATENT DOCUMENTS

| 3,878,278 A | 4/1975 | Miller et al. ................ 264/45.3 |
| 3,989,534 A | 11/1976 | Plunguian et al. ............ 106/86 |
| 4,137,198 A | 1/1979 | Sachs ......................... 521/154 |

(List continued on next page.)

FOREIGN PATENT DOCUMENTS

| DE | 3920025 | 1/1991 |
| EP | 0 216 297 | 4/1987 |
| EP | 0 486 467 | 5/1992 |
| EP | 0 985 504 | 3/2000 |
| GB | 2 022 503 | 12/1979 |
| GB | 2048235 | 10/1980 |
| JP | 49-111928 | 10/1974 |
| JP | 2-267148 | 10/1990 |
| JP | 3-28181 | 2/1991 |
| WO | WO 98/30515 | 7/1998 |
| WO | WO 9954265 | 10/1999 |
| WO | WO 00/76937 | 12/2000 |
| WO | WO 01/34534 | 5/2001 |
| WO | WO 02/48254 | 6/2002 |
| WO | WO 02/083594 | 10/2002 |
| WO | WO 03/012218 | 2/2003 |

OTHER PUBLICATIONS

F. Hayashi et al., "Polyurethane–Gypsum Foams," Int. Prog. Urethanes, 3:113–133 (1981).

The Dow Company, "Methocel Cellulose Ethers for Gypsum–Based Building Materials—The final touch for building materials" (Aug. 1999).

T. Michelsen, "Building Materials (Survey)," Encyclopedia of Chemical Technology, 4th Edition, pp. 618–619 (1992).

ASTM Standard Designation: C 473–95, pp. 249–259 (1995).

(List continued on next page.)

*Primary Examiner*—Leszek Kiliman
(74) *Attorney, Agent, or Firm*—Fowler White Boggs Banker, PA; Christopher Paradles

(57) ABSTRACT

A reinforced wallboard core is prepared from a slurry comprising a mixture of β-calcium sulfate hemihydrate, a cellulose ether additive other than CMC and an amount of water that is sufficient to form a slurry and resulting in a wallboard density of less than 0.8 g/cc. The β-calcium sulfate hemihydrate is hydrated by the water forming a wallboard core reinforced by the cellulose ether additive. The cellulose ether, having a molecular weight of at least about 20,000 and a viscosity grade of at least about 100 cps, is selected to give the reinforced wallboard core improved nail pull resistance and greater flexural strength than unreinforced wallboard of the same density. The reinforced wallboard core may be used for reduced-paper wallboard and/or for lightweight wallboard, for example.

55 Claims, 20 Drawing Sheets

U.S. PATENT DOCUMENTS

| | | | | |
|---|---|---|---|---|
| 4,148,781 A | 4/1979 | Narukawa et al. | ....... | 260/42.51 |
| 4,153,470 A | 5/1979 | Stahl et al. | ................. | 106/116 |
| 4,265,964 A | 5/1981 | Burkhart | .................... | 428/306 |
| 4,330,589 A | 5/1982 | Saito et al. | ............. | 428/312.4 |
| 4,487,864 A | 12/1984 | Bermudez et al. | ............. | 524/2 |
| 4,518,652 A | 5/1985 | Willoughby | ............. | 428/312.4 |
| 4,778,529 A | 10/1988 | Barker et al. | ................. | 106/93 |
| 4,808,360 A | 2/1989 | Natori et al. | ............... | 264/221 |
| 4,845,207 A | 7/1989 | t'Sas | ......................... | 536/91 |
| 4,902,348 A | 2/1990 | Kossatz et al. | ............. | 106/111 |
| 4,923,538 A | 5/1990 | Hill | ............................. | 156/78 |
| 4,949,518 A | 8/1990 | Nagel et al. | .................... | 52/239 |
| 4,994,113 A | 2/1991 | Helmstetter | ................. | 106/618 |
| 5,109,030 A | 4/1992 | Chao et al. | .................... | 521/83 |
| 5,194,091 A | 3/1993 | Laney | ........................ | 106/611 |
| 5,277,712 A * | 1/1994 | McInnis | .................... | 106/774 |
| 5,344,490 A | 9/1994 | Roosen et al. | ............. | 106/778 |
| 5,385,607 A | 1/1995 | Kiesewetter et al. | ..... | 106/197.1 |
| 5,387,626 A | 2/1995 | Böhme-Kovac et al. | ...... | 524/35 |
| 5,401,798 A | 3/1995 | Rasp et al. | ................. | 524/423 |
| 5,414,970 A | 5/1995 | Bontrager et al. | ............ | 52/408 |
| 5,432,215 A | 7/1995 | Girg et al. | .................... | 524/28 |
| 5,482,551 A | 1/1996 | Morris et al. | ................ | 106/772 |
| 5,590,501 A | 1/1997 | Stoddart et al. | ............. | 52/408 |
| 5,641,584 A | 6/1997 | Andersen et al. | ........... | 428/703 |
| 5,658,656 A | 8/1997 | Whitney et al. | ......... | 428/304.4 |
| 5,765,334 A | 6/1998 | Vitous | ..................... | 52/745.19 |
| 5,817,262 A | 10/1998 | Englert | ........................ | 264/86 |
| 5,879,486 A | 3/1999 | Philips et al. | ................. | 156/39 |
| 5,879,825 A | 3/1999 | Burke et al. | ................ | 428/703 |
| 5,888,322 A | 3/1999 | Holland | ....................... | 156/39 |
| 5,888,642 A | 3/1999 | Meteer et al. | ........... | 428/313.5 |
| 5,945,208 A | 8/1999 | Richards et al. | ......... | 428/294.7 |
| 6,042,665 A | 3/2000 | Kiraly et al. | ................. | 156/39 |
| 6,162,839 A | 12/2000 | Klauck et al. | ................ | 521/83 |
| 6,171,388 B1 | 1/2001 | Jobbins | ...................... | 106/778 |
| 6,251,979 B1 | 6/2001 | Luongo | ...................... | 524/423 |
| 6,319,312 B1 | 11/2001 | Luongo | ...................... | 106/675 |
| 6,402,832 B1 | 6/2002 | Vijayendran et al. | ....... | 106/778 |
| 6,406,779 B1 | 6/2002 | Carbo et al. | ................. | 428/219 |
| 6,485,821 B1 | 11/2002 | Bruce et al. | ............. | 428/304.4 |
| 6,492,450 B1 | 12/2002 | Hsu | ........................... | 524/423 |
| 6,699,915 B2 * | 3/2004 | Hilton et al. | ................. | 521/83 |
| 6,743,830 B2 * | 6/2004 | Soane et al. | .................. | 521/83 |
| 2002/0045684 A1 | 4/2002 | Bacher et al. | ................. | 524/4 |

OTHER PUBLICATIONS

ASTM Standard Designation: C 36–95b, pp. 47–49 (1995).

ASTM Standard Designation: D3876–96, pp. 1–3 (2001).

The Dow Chemical Company, "Methocel Cellulose Ethers—Helping to Create Better Building Materials" (Dec. 2000).

F. Brandt et al., "Bassanite ($CaSO_4 \cdot 0.5H_2O$) Dissolution and Gypsum ($CaSO_4 \cdot 2H_2O$) Precipitation in the Presence of Cellulose Ethers," Journal of Crystal Growth 233:837–845 (2001).

U. Ludwig et al., "Effect of Temperature and Methyl Cellulose on the Hydration of Gipsum β–Hemihydrate," Il Cemento, vol. 1, pp. 39–50 (1979).

S–I. Takahashi et al., "Relationship between Distribution of Substituents and Water Solubility of O–Methyl Cellulose," Journal of Polymer Science: Part A: Polymer Chemistry, 25:987–994 (1987).

\* cited by examiner

REINFORCED WALLBOARD

RELATED APPLICATION

This application claims the benefit of U.S. Provisional Application No. 60/425,924, filed Nov. 12, 2002, the entire disclosure of which is incorporated by reference herein.

FIELD OF THE INVENTION

The field of the invention is wallboards for use in construction, including paper-covered wallboard, paperless wallboard, sheathing board, moisture resistant board, type-X board, insulation board, shaft liner, soffit board, backing board, core board, ceiling board, gypsum glass mat board and a method of manufacturing such wallboards.

BACKGROUND OF THE INVENTION

A modified cellulose, also referred to herein as a cellulose derivative, is used in plaster and joint compounds as a thickener (or to modify the rheology in some way) and to improve the workability of gypsum-based compounds. Cellulose ethers have been known to improve some other properties, including the consistency, adhesion and water retention of gypsum-based joint compounds and tile adhesives. However, some of these properties, specifically thickening, are not considered beneficial for the production of wallboard. Wallboard is formed from a slurry that is continuously mixed and fed onto a belt. Thus, it is desirable for the slurry used to make wallboard to be thinner than a plaster.

Typically, a small amount, e.g. less than 0.25 wt %, of cellulose ethers is added to the dry ingredients of plaster or joint compound, which may be limestone-based rather than gypsum-based, prior to mixing with water. This tends to improve the strength of the plaster or joint compound somewhat, as well as providing the desired thickening. However, additions of cellulose ethers greater than 0.25 wt %, particularly at high viscosity grade (the viscosity of an aqueous solution of the cellulose ether measured at a 2 wt % concentration of the cellulose ether in water), tend to reduce the strength of gypsum-based products. See Udo Ludwig and N. B. Singh, *Il Cemento*, v.1 (1979) 39–50, and Felix Brandt and Dirk Basbach, *Journal of Crystal Growth*, v.233 (2001) 837–845, reporting that the addition of high viscosity grades of cellulose ethers, for example methyl cellulose, adversely affects the development of gypsum crystals and strength. Thus, larger additions of cellulose ethers are usually avoided in commercial plasters.

Wallboard, which is used herein to also designate such products as sheathing board, moisture resistant board, type-X board, insulation board, shaft liner, soffit board, backing board, core board, ceiling board, gypsum glass mat board, and paperless wallboard, is typically prepared by mixing dehydrated inorganic materials such as calcined gypsum or stucco with water and pouring the resulting slurry into molds, forms or sheets where it hydrates, hardens and dries. Calcined gypsum powder (calcium sulfate hemihydrate and/or calcium sulfate anhydrite) is usually mixed with water and less than 1 wt % of a variety of additives, for example accelerants. Dissolution of the calcined gypsum powder in the water and a resulting hydration reaction causes crystallization of gypsum crystals (calcium sulfate dihydrate) forming the wallboard core. Application of multi-ply face sheets is usually integrated with the formation of the wallboard core. This is often followed by mild heating to drive off the remaining free (unreacted) water to yield a dry product, having face sheets adhered to gypsum core.

Lukevich et al. (WO 99/54265) discloses a method to produce formed gypsum products by extrusion of an α-gypsum paste (using α-calcium sulfate hemihydrate). It is known that α-gypsum is slow setting and drying; therefore, Lukevich et al. prepares an extrudable paste using a nearly stoichiometric combination of α-gypsum plaster and water; however, addition of a clay rheology modifier and a methyl cellulose binder are added to reduce friability (page 1, paragraph 4). The resulting composition is an extrudable paste having near stoichiometric composition of water and α-gypsum and not a slurry.

Thus, Lukevich et al. teaches away from using β-calcium sulfate hemihydrate, which requires an excess of water over and above the stoichiometric limits taught by Lukevich, to form a slurry that can be extruded and requiring a step of drying (page 1, paragraph 3). Additionally, the extrusion of the nearly dry, non-fluid paste, containing clay as a rheology modifier and a cellulose ether as a binder, results in a plaster product with a much greater density and vastly different microstructure than a wallboard core prepared using a slurry of β-calcium sulfate hemihydrate and water.

Morris et al., U.S. Pat. No. 5,482,551, which issued Jan. 9, 1996, disclose a gypsum-based, extruded construction material with a high modulus of rupture and a method of extrusion processing of the construction material. Morris et al. teach a formulation having a low fraction of water to dry ingredients, including gypsum, clay, perlite, a powdered ethyl cellulose binder/rheology aid and fiberized cellulose paper, such that the mixture is a crumbly, semi-dry extrudable composition that maximizes the wet modulus of rupture. Morris et al. teach that an extruded wall panel must have a high enough wet strength to be self supporting.

However, the extruded construction material of Morris et al., like that of Lukevich, is too dense to be used commercially as wallboard. Even with substantial inclusions of lightweight perlite (16% by weight of the dry ingredients) and near the maximum ratio of water:gypsum allowed by Morris et al. (0.8), the density of the product was still 54.8 pcf (0.88 g/cc). Typical densities were about 69 pcf (1.1 g/cc). These densities are unacceptable for production of commercial wallboard, because the added weight of the wallboard adds significantly to higher transportation, handling, and installation costs compared to conventional wallboard.

Gypsum-based wallboard is used primarily as inexpensive and easily formable coverings with adequate compressive strength, nail pull resistance, flexural strength and good fire resistance. However, even conventional gypsum-based wallboard products are heavy compared to other modem building materials, and this extra weight adds to the cost of production, delivery, installation and disposal of gypsum-based construction materials compared to competing products. Thus, it is desirable to retain the beneficial qualities of gypsum-based wallboard while reducing the overall cost of installed wallboard sheets by reducing the weight of gypsum-based wallboard.

Also, strength of conventional wallboard is related primarily to the strength of the facing paper, typically an oriented fiber, multi-ply facing paper that is applied to the gypsum-based slurry, which forms the core of the wallboard, during a continuous forming process. For a ½ inch wallboard with a density of about 0.6 g/cc, approximately one-half of the nail pull resistance and two-thirds of the flexural strength are supplied by the paper face sheets, which also account for 40% of the manufacturing costs. The core is usually exceptionally poor at handling tensile loads of any kind.

Others have reduced the weight of the core further by adding porosity and/or a low-density, expanded filler (e.g. perlite) into the conventional material. Adding such porosity or filler decreases the density of the core, but also reduces the strength of the wallboard. The strength of gypsum sheets decreases dramatically with density. For example, a dramatic decrease of the nail-pull resistance with density of ½-inch gypsum wallboard, both papered and non-papered, can be seen in FIG. 3.

Typically, the rate of loss in strength is not merely proportional with the reduction in density, but instead the strength-to-weight ratio of the wallboard core decreases with the addition of porosity and/or low-density filler, such as perlite, compared to that of a fully dense gypsum wallboard core. The resulting flexural strength of the wallboard may be acceptable, so long as the strength of the multiply facing is sufficient to offset any weakening of the core, and the reduced core density does not cause the failure mode to change from tensile failure of the facing to crushing of the core. However, nail pull resistance of the wallboard is reduced by addition of such porosity, because increasing porosity rapidly reduces the resistance of the core to crushing and densification. Therefore, the nail pull resistance of the wallboard, which depends greatly on the nail pull resistance of the core, becomes the limiting criterion for wallboard with low-density cores covered by face sheets. For paperless wallboard core, the flexural strength may be the limiting failure criterion, because unreinforced gypsum wallboard cores have little, if any, resistance to the tensile load components in the flexural strength test.

Another way of compensating for the introduction of lower density substitutes (e.g., expanded perlite or air voids) for part of the set gypsum matrix is to increase the strength of the set gypsum above normal levels in order to maintain overall core strength. A number of additives, such as cellulosic particles and fibers, have been included to further improve the mechanical properties of cementitious products. More expensive glass fibers are used in place of wood in applications where high fire resistance is required, such as the shaft liner for elevators. However, conventional fibers, particularly glass, do not adhere well to the gypsum matrix and decrease the workability of the gypsum slurry, thus limiting possible improvements to the core strength. Glass fibers are also brittle and can be easily dislodged during board handling, installation, or demolition to cause irritation of the skin or respiratory tract.

More recently, there has been increasing interest in improving the strength and wear resistance of construction materials by incorporating polymers and/or starches into the core material, although starches are not generally considered strength enhancers. Cementitious composites containing water-dispersible polymers having modest improvement in strength-to-weight have been found by adding latex or other strengthening polymers to the cementitious materials.

However, several unique challenges have thus far restricted the commercialization of polymer reinforced cementitious products to relatively expensive niche products. For example, the nail pull resistance may decrease with the addition of some organic additives or an increase in nail pull resistance may require concentrations of polymers greater than 5 wt %, which can lead to problems such as inflammability, reduced extinguishability, commercially unacceptable cost of the wallboard, and mold susceptibility. Therefore, there is a longstanding and unresolved need for an additive that can increase both the nail pull resistance and the flexural strength of wallboard core, allowing the core density to be reduced.

Cellulose is a polysaccharide composed of individual anhydroglucose units which are linked through a glycosidic bond (FIG. 16). The number 'n' of anhydroglucose units in the polymer chain is defined as the degree of polymerisation. Typically, production of cellulose ethers (CE's) involves replacing some of the hydroxyl hydrogen groups of cellulose with a substituent group, for example a methyl group, an ethyl group, a carboxymethyl group, a hydroxyehthyl group, a hydroxypropyl group, or some combination thereof. For example, a hydroxyethyl methyl cellulose (HEMC) may be produced by replacing some of the groups of cellulose with hydroxyethyl groups and methyl groups. Likewise, a hydroxypropyl methyl cellulose (HPMC) may be produced with hydroxypropyl and methyl groups replacing some of the hydroxyl groups of the cellulose.

The number of substituted hydroxyl groups per anhydroglucose unit is expressed as the degree of substitution (DS). The DS can vary between 0 and 3. As with all polymer reactions, this reaction does not occur uniformly along the polymer chain. The reported degree of substitution is therefore a mean degree of substitution over the whole polymer chain. Alternatively, molar substitution (MS) may be used to report the number of moles of substituent groups, such as a hydroxypropyl group, per mole of anhydroglucose. Often, manufacturers follow a convention whereby one of the substituents is reported by DS and the other by MS, where the substituent reported by MS may replace a hydroxyl group or may attach to another substituent in a chain. The DS is not always reported, and we have found that the value reported is often inaccurate or given as a broad range, as shown in Table I.

In another alternative, the weight percent of substituents is reported. Weight percent of substituents may be directly related to DS and MS. For example, the following equations show the conversion for HPMC:

$$DS(OCH_3) = \frac{wt\ \%\ OCH_3}{31} * \frac{162}{100 - (wt\ \%\ OC_3H_6OH/1.29 + wt\ \%\ OCH_3 * 0.45)} \quad \text{EQ. 1}$$

and $$MS(OC_3H_6OH) = \frac{wt\ \%\ OC_3H_6OH}{75} * \frac{162}{100 - (wt\ \%\ OC_3H_6OH/1.29 + wt\ \%\ OCH_3 * 0.45)} \quad \text{EQ. 2}$$

Cellulose ethers are conventionally differentiated by type of substituent and the viscosity of an aqueous solution of the cellulose ether. For example methyl cellulose (MC), ethyl cellulose (EC), carboxymethyl cellulose (CMC), hydroxyethyl cellulose (HEC), ethyl hydroxyethyl cellulose (EHEC), ethyl hydroxypropyl cellulose (EHPC) and hydroxypropyl cellulose (HPC) are named for the type of substituent group used to replace the hydroxyl group in cellulose. The viscosity of an aqueous solution including a cellulose ether is an important characteristic for its typical use as a thickener; therefore, cellulose ethers are also differentiated by viscosity, which depends on the degree of polymerization (directly related to the measured molecular weight), and the type and degree of substitution of substituent groups. As the molecular weight increases, the viscosity of an aqueous solution of the cellulose ether increases also. However, the effect of the degree of substitution depends on the particular type of substituent group, which may also effect the solubility of the cellulose ether.

Manufacturers characterize the effect of a particular cellulose ether on the viscosity by reporting the measured viscosity of a 2 wt % aqueous solution of the cellulose ether. Herein, we refer to this 2 wt % viscosity as the viscosity grade of the particular cellulose ether. Typically, the viscosity grade is measured by one of two techniques: Brookfield and Ubbelohde. Often, the measured viscosity grade differs between the two techniques. For example, results using both techniques are shown in Table I for some cellulose ethers.

Cellulose ethers are not typically used in wallboard products, but may be used at low molecular weights (low viscosity) and low concentrations to provide proper water retention, pumpability and/or increase mixing blade life.

SUMMARY OF THE INVENTION

A wallboard core comprises water, β-calcium sulfate hemihydrate and an additive, which are mixed together to form the wallboard core. Herein, the term wallboard is used to also designate such products as sheathing board, moisture resistant board, type-X board, insulation board, shaft liner, soffit board, backing board, core board, ceiling board, gypsum glass mat board, and paperless wallboard, which may be used to finish walls and ceilings in the construction industry.

Upon mixing with the water, the β-calcium sulfate hemihydrate may dissolve or partially dissolve in the water and hydrates, over time, forming gypsum crystals. The additive is selected from one or more cellulose ethers having, for example, a molecular weight of at least 20,000 and a viscosity grade of at least 100 cps, such as HPC, HEC, MC, HPMC, EHEC, EHPC and HEMC, without limiting in any way to those listed here, increasing both the nail pull resistance and flexural strength of the wallboard core. Preferably, the weight percent of cellulose ether to β-calcium sulfate hemihydrate is selected to be less than 5 wt %, more preferably less than 3 wt %, whereby the cellulose ether has a negligible effect on the inflamability and extinguishability of the wallboard. Even more preferably, the weight percent is selected from 0.5 wt %, alternatively from 0.5–3 wt %, for cellulose ethers that show a continuously increasing nail pull resistance from 0.5 wt % to 3 wt %, which greatly simplifies the mixing process. Alternatively, a cellulose ether with a low degree of substitution (DS) is chosen.

The increased nail pull resistance and flexural strength imparted to the reinforced wallboard core makes it possible to reduce or eliminate the costly and heavy multi-ply paper surfaces of the wallboard. The multi-ply paper facing can also increase the undesirable mold susceptibility of wallboard by feeding mold growth after absorbing water from the surrounding environment. Thus, a mold resistant wallboard may be fabricated using a reduced paper wallboard core that is strengthened by a cellulose ether additive. Although paper is a cellulose, cellulose derivatives, such as cellulose ethers, do not tend to feed mold growth when added to the wallboard core, as shown by mold resistance tests of specimen maintained at 32 degrees C. in an incubator with 90% humidity and in the presence of mold spores. In an alternative embodiment, a skim layer is added to at least one surface provides even greater mold resistance. There is a longstanding and unresolved need for low cost wallboard having such mold resistance.

A lightweight wallboard, for example with a conventional multiply facing sheet or sheets, may be fabricated by reducing the density of the wallboard core without sacrificing the nail pull resistance of the wallboard. For example, the density may be reduced below 0.75 g/cc using a lightweight filler or by introducing porosity into the core in the form of voids or air bubbles while maintaining the flexural strength and nail pull resistance of the wallboard.

Addition of an excess amount of water to the slurry, over and above the stoichiometric amount of water needed to hydrate the powdered dry ingredients, reduces the density of the wallboard core. It is believed, without being limiting in any way, that the excess water forms droplets in the wallboard core that, after drying, remain in the wallboard core as pores. A general, empirical correlation has been found for predicting the wallboard density in g/cc ($\rho$) with the water to powdered dry ingredient ratio (W:P), if foaming is negligible: $\rho=0.8324(W:P)^{-0.7629}$. The addition of foaming, whether by rapid stirring or addition of a foaming agent, may further reduce the density by introducing porosity into the wallboard core in addition to the amount introduced by the excess water.

By adding additional water to the slurry, viscosity of the slurry is reduced. Thus, a slurry containing substantially no clay may be extruded in a continuous extrusion process, forming lightweight, reinforced wallboard. By substantially no clay, it is meant that no clay is added to the dry ingredients as a rheology modifier. Of course, clay may be present as an impurity in the dry ingredients or the water at a level that does not significantly affect the rheology of the extrusion process.

One method of producing the wallboard core mixes dry ingredients comprising β-calcium sulfate hemihydrate powder and a powdered additive selected from cellulose ethers other than CMC, the cellulose ether being selected to have a degree of substitution (DS) that is soluble in water (e.g. from 1.2 to 2.4 for MC). For commercially available cellulose ethers, having a range of DS from 1.6 to 1.9, for example, a viscosity grade of at least about 100 cps and a molecular weight of at least about 20,000 MW is preferred.

For a high degree of substitution (DS), e.g. greater than 1.8 for methyl cellulose (MC), a higher viscosity grade (e.g. at least about 200 cps) is preferred. Surprisingly, a higher DS is associated with a lower nail pull resistance for cellulose ethers, such as MC. Thus, a low DS (e.g. in a range from 1.2 to 1.8 for MC) is preferred, because a lower viscosity grade cellulose ether may be selected or a lower fraction of the cellulose ether additive may be added, while still achieving the same nail pull resistance. By lowering the viscosity grade, the slurry becomes easier to mix, given the same amount of water. By lowering the amount of water, the wallboard dries quicker, given the same slurry viscosity. By lowering the fraction of cellulose additive in the slurry, the manufacturing cost of the wallboard is decreased.

Thus, a range of DS from 1.2 to 1.6 for MC is even more preferred, for example. Although MC is not available commercially in this range, the surprising and unexpected correlations for such low DS cellulose ethers, providing greatly enhanced flexural strength and nail pull resistance, the low cost of manufacturing such cellulose ethers, and the high volumes of MC to be used in reinforced wallboard manufacture is expected to drive the development of commercial grades of MC in this range of DS.

In another embodiment, it is preferable to select a viscosity grade of at least about 400 cps. Surprisingly, by selecting a cellulose ether greater than this viscosity grade, the nail pull resistance of the resulting wallboard core increases significantly compared to unreinforced wallboard core for additions of from 0.5 wt % to 3 wt % of all cellulose ethers tested, except for CMC, so long as the cellulose ether is well dispersed throughout the β-calcium sulfate hemihydrate prior to adding to water, even at relatively high DS. At low DS, the correlations show that nail pull index and flexural strength index are dramatically increased compared to any conventional wallboard.

An amount of water may be selected to form a slurry with the dry ingredients that results in a finished wallboard core density of 0.75 g/cc after extrusion, setting and drying in an oven at 45° C. until the density remains constant. In addition, many other additives, including other cellulose ethers may be added to tailor the properties of the wallboard core without diminishing the nail pull resistance and strength of the wallboard core.

In one embodiment, these dry ingredients may be well mixed to thoroughly disperse the additive throughout the β-calcium sulfate hemihydrate powder. Then, the dry ingredients are added to and mixed with the water, poured onto a form, formed into a sheet, allowed to set, dried and trimmed. The amount of water selected will always be in excess of the amount needed for extrusion and for the amount of water required for a stoichiometric combination of the β-calcium sulfate hemihydrate and water to form gypsum. Preferably, the amount of water is selected to produce a wallboard core with a density less than 0.8 g/cc, more preferably less than 0.75 g/cc, even more preferably in a range from 0.45 g/cc to 0.7 g/cc for lightweight wallboard.

By a "slurry," it is meant that the mixture of dry ingredients and water forms a homogeneous fluid that can be well mixed, dissolving at least a portion of the β-calcium sulfate hemihydrate in the water prior to extruding the slurry. The amount of water required depends, for example, on the amount of β-calcium sulfate hemihydrate, the amount of additive and other dry ingredients, as well as the temperature and the type of additive or additives included in the slurry. The amount of water used significantly alters the microstructure of the wallboard core, for example by affecting the amount of porosity, the extent of dissolution of the β-calcium sulfate hemihydrate, the rate of hydration and the morphology of the gypsum crystals, which in turn affects the nail pull resistance and flexural strength of the wallboard. A foam may be added to the slurry, instead of adding additional water, in order to reduce the density to a preferred range for a specific application. For example, a foaming agent, such as a surfactant or chemically active foaming agent, may be added in the water and/or the slurry to cause foam during stirring of the water and/or slurry. Adding a foam may result in a shorter drying time and/or a more preferable distribution of the porosity than a process that would produce a wallboard with an equivalent density by merely increasing the amount of water. Alternatively, a low density filler may be added.

The process may be a continuous process, whereby the dry ingredients are mixed, added to the water, blended into a slurry and the slurry is poured onto a moving surface to form the wallboard core. A form may both contain the slurry and form the two edges of the wallboard, while one or more rolls or restrictions spread and flatten the free surface of the slurry, whereby an elongated, continuous sheet is formed. Following forming of the continuous wallboard core, the end of the elongated sheet of slurry, after being allowed to set at least partially, is cut into lengths from the rest of the elongated, continuous sheet. Then, the wallboard is trimmed if necessary and dried. Alternatively, one or more facing sheets may be added during the process on one or both sides of the wallboard core.

Another method of producing the wall board mixes a strengthening additive with the water before mixing with the powdered β-calcium sulfate hemihydrate. In this method, the additive, whether dry, paste, gel or liquid, is at least partially dissolved in the water. Then, the dry ingredients, including the β-calcium sulfate hemihydrate and optionally other dry additional additives, are added to and mixed with the aqueous solution to form a slurry. The slurry is then processed as before.

One or more paper layers may be adhered to one or both sides of the wallboard core or facing sheets, for example for decorative purposes and/or to impart improved strength. The paper may have fibers, which may be oriented to strengthen the wallboard in a preferred direction. Alternatively, no paper layers may be added or a non-paper layer may be adhered to one or both sides of the wallboard core. In yet another alternative, a second additive may be included in the dry ingredients that segregates to one or both surfaces of the wallboard, forming an in situ surface layer on the wallboard.

"At least about" 100 cps means that cellulose ether should be selected from cellulose ethers having a viscosity grade of about 100 cps or greater, and "about" 100 cps should be understood to take into consideration normal variations in commercial measurements of the viscosity grade, based for example on the use of different measurement techniques. For example, differing selection of shear rate for measuring viscosity grade may cause variations in the measured value. A variation of as much as 30% from the viscosity grade reported by manufacturers is to be expected at low viscosity grades up to 1000 cps. Viscosity grades greater than about 1000 cps show an even greater variation in the viscosity grade.

"At least about" 20,000 MW means that cellulose ether should be selected from cellulose ethers having a molecular weight of "about" 20,000 or greater. It should be understood that the mean value of the molecular weight for a specific type of commercial cellulose ether with a specific degree of substitution may be 20,000, but that variations between batches and variations within a batch allow for significant commercial variances in the mean and standard deviation from the mean of the molecular weight. Typically, the mean molecular weight may vary by as much as 20% from the manufacturer's specification. The standard deviation within a batch depends, for example, on manufacturing tolerances, the process chosen to manufacture a particular cellulose ether, and the variations already present in the raw cellulose prior to substitution.

A nail pull index and flexural strength index are presented herein that normalize the measurements of nail pull resistance and flexural strength for wallboard and ceiling board specimens having a spectrum of board weights by comparing the strength measurements to the strength of specimens prepared without a strengthening additive at the same wallboard weight and thickness. For example, the nail pull resistance versus board weight for conventional wallboard is shown in FIG. 3 for specimens with and without paper. The nail pull index, as shown in FIG. 5 for some embodiments, is a comparative measure nail pull resistance of a reinforced specimen to a conventional specimen at the same density (board weight). Therefore, a nail pull index of 1.0 means that a reinforced wallboard specimen has the same nail pull resistance as a specimen prepared conventionally without reinforcing additions.

DETAILED DESCRIPTION OF THE PREFERRED EMBODIMENTS

A reinforced wallboard and/or ceiling board comprises a calcium sulfate hemihydrate, a reinforcing additive and water. The calcium sulfate hemihydrate is preferably β-calcium sulfate hemihydrate and may be produced by calcining gypsum, for example. The reinforcing additive is dispersable in water and may be produced and used in various forms, such as aqueous solutions, granules and powders. For example, one reinforcing additive is a cellulose ether. Cellulose ethers may be used with a wide variety of substituent groups. For example, HPC, HEC, MC, HPMC, EHEC, EHPC and HEMC may be used as the reinforcing additive.

In one embodiment, dry β-calcium sulfate hemihydrate powder and powdered HPMC are mixed together, dispersing the powdered HPMC additive throughout the β-calcium sulfate hemihydrate powder. The dry ingredients are then added to water, including an excess of water beyond that required to hydrate the β-calcium sulfate hemihydrate stoichiometrically, forming a slurry by stirring of the powder/water mixture. For example, the amount of water used is selected such that the finished wallboard has a density less than 0.8 g/cc, more preferably less than 0.75 g/cc. Then, the slurry is extruded through a die or a form or a series of dies and forms. The extruded slurry is then fed onto a belt into a continuous sheet. The slurry is allowed to harden, which is also referred to as setting and is a result of the β-calcium sulfate hemihydrate at least partially dissolving and hydrating, forming calcium sulfate dihydrate crystals, referred to herein as gypsum crystals.

Then, the setting wallboard or wallboard specimen is dried. Air drying or drying in a furnace evaporates the excess water that has not reacted during hydration, but that is required to form a slurry. Excess water also tends to increase the amount of porosity dried wallboard core, because the evaporation of the excess water leaves behind porous microstructure. The sheets may then be trimmed, sized, weighed and tested.

Tests include measuring the nail pull resistance, flexural strength, humidified deflection, mold resistance, and inflamability, for example using ASTM standard test procedures. Mold resistance is defined as showing no signs of mold growth on a wallboard or wallboard core surface after 24 days of exposure to mold spores within an environment maintained at 90% humidity and a temperature of 32° C.

Figure 1:
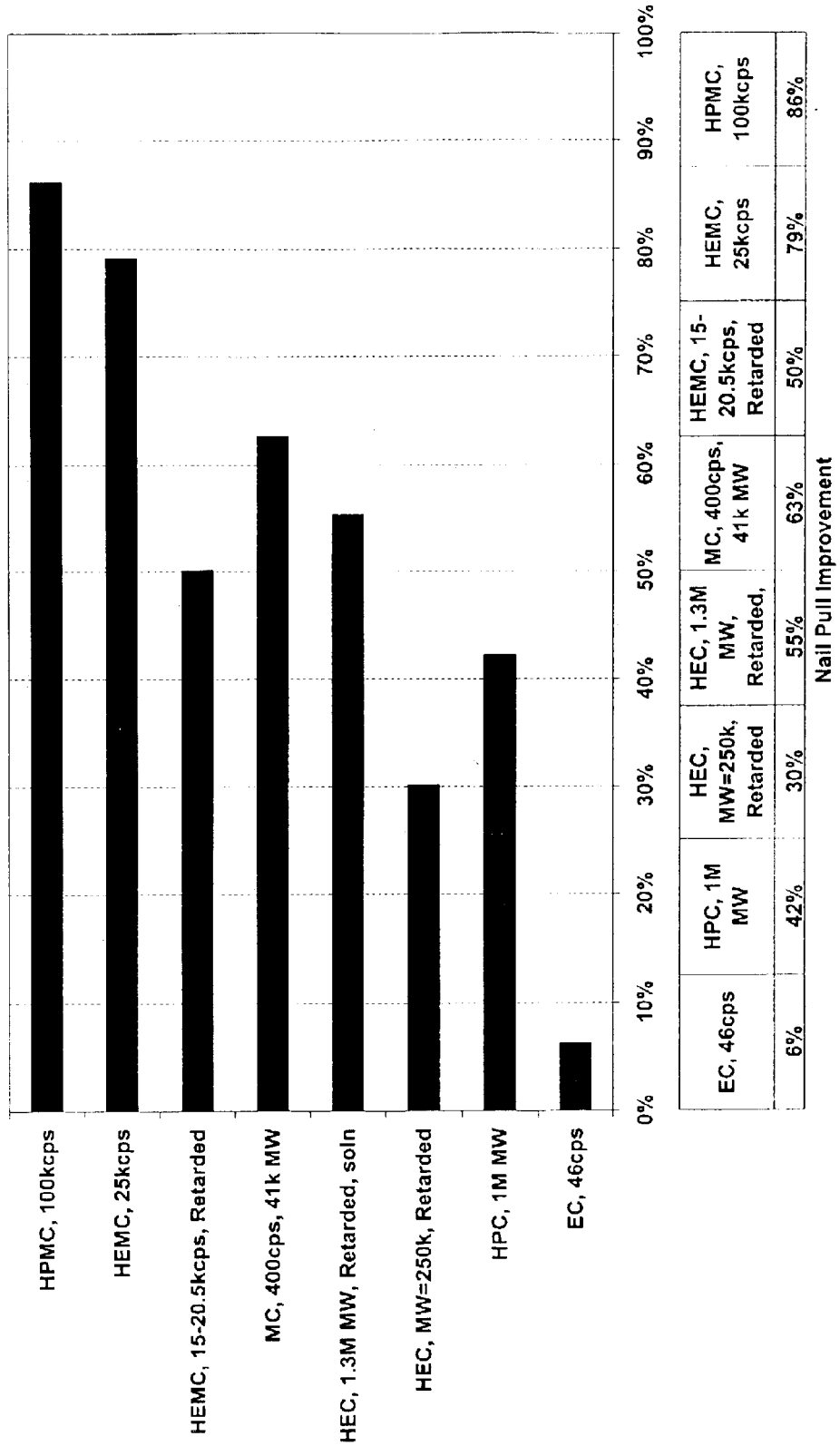
FIG. 1 shows the improvement in nail pull resistance of several embodiments of the present invention at a concentration of 1 g of additive/100 g β-calcium sulfate hemihydrate.
Figure 2:
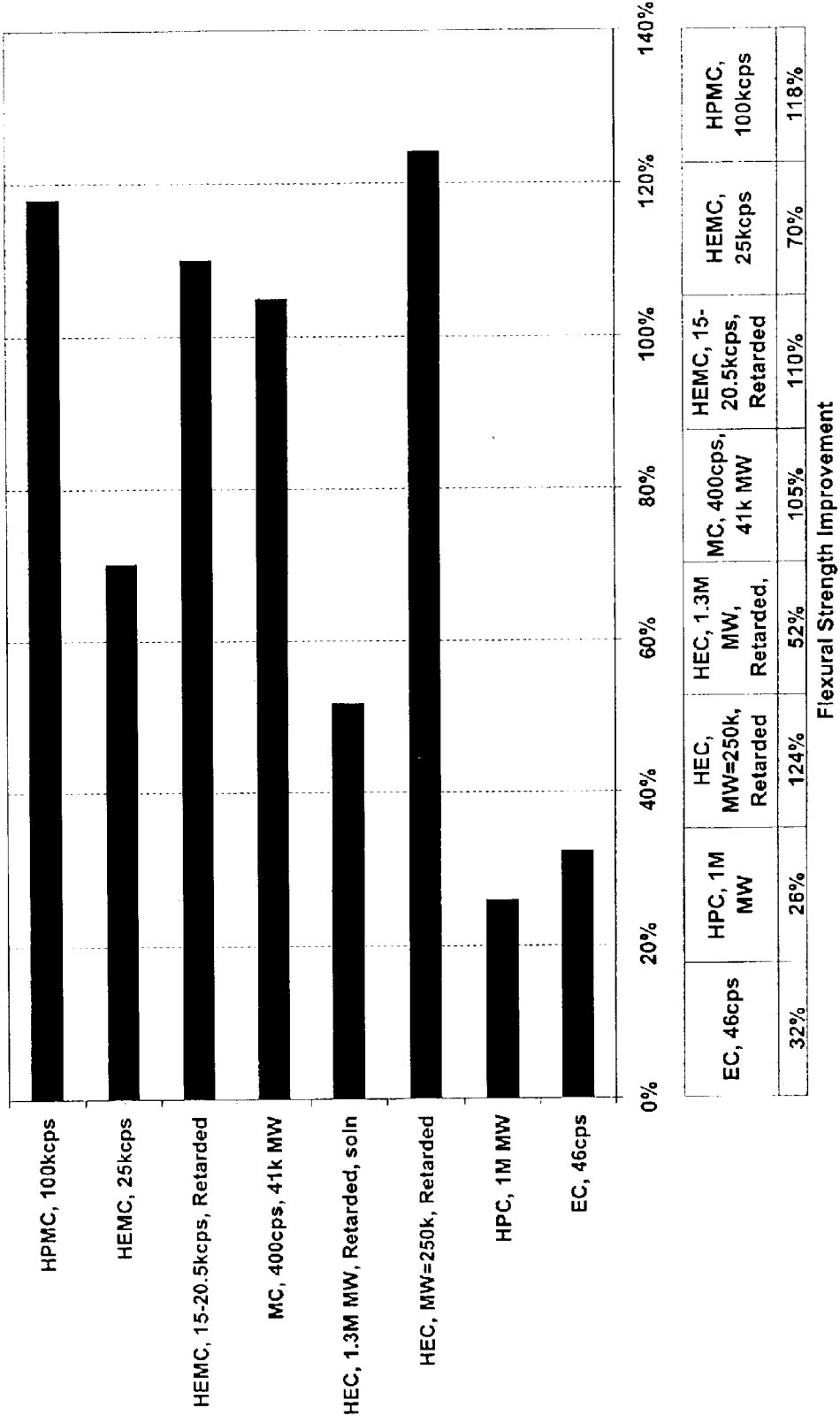
FIG. 2 shows the improvement in flexural strength of the same embodiments as shown in FIG. 1.
Figure 3:
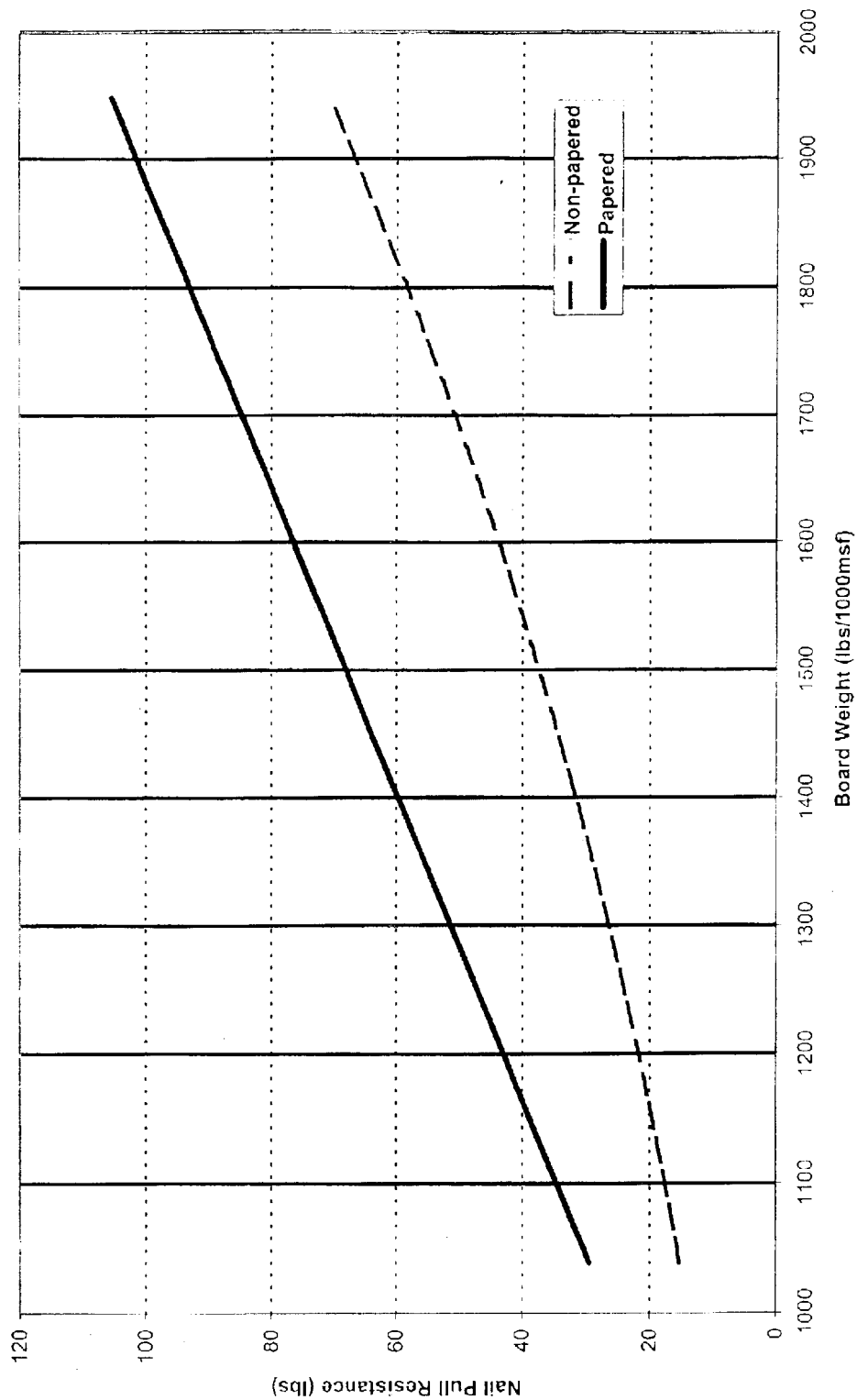
FIG. 3 shows the nail pull resistance versus board weight of wallboard specimens prepared according to the prior art.
Figure 4:
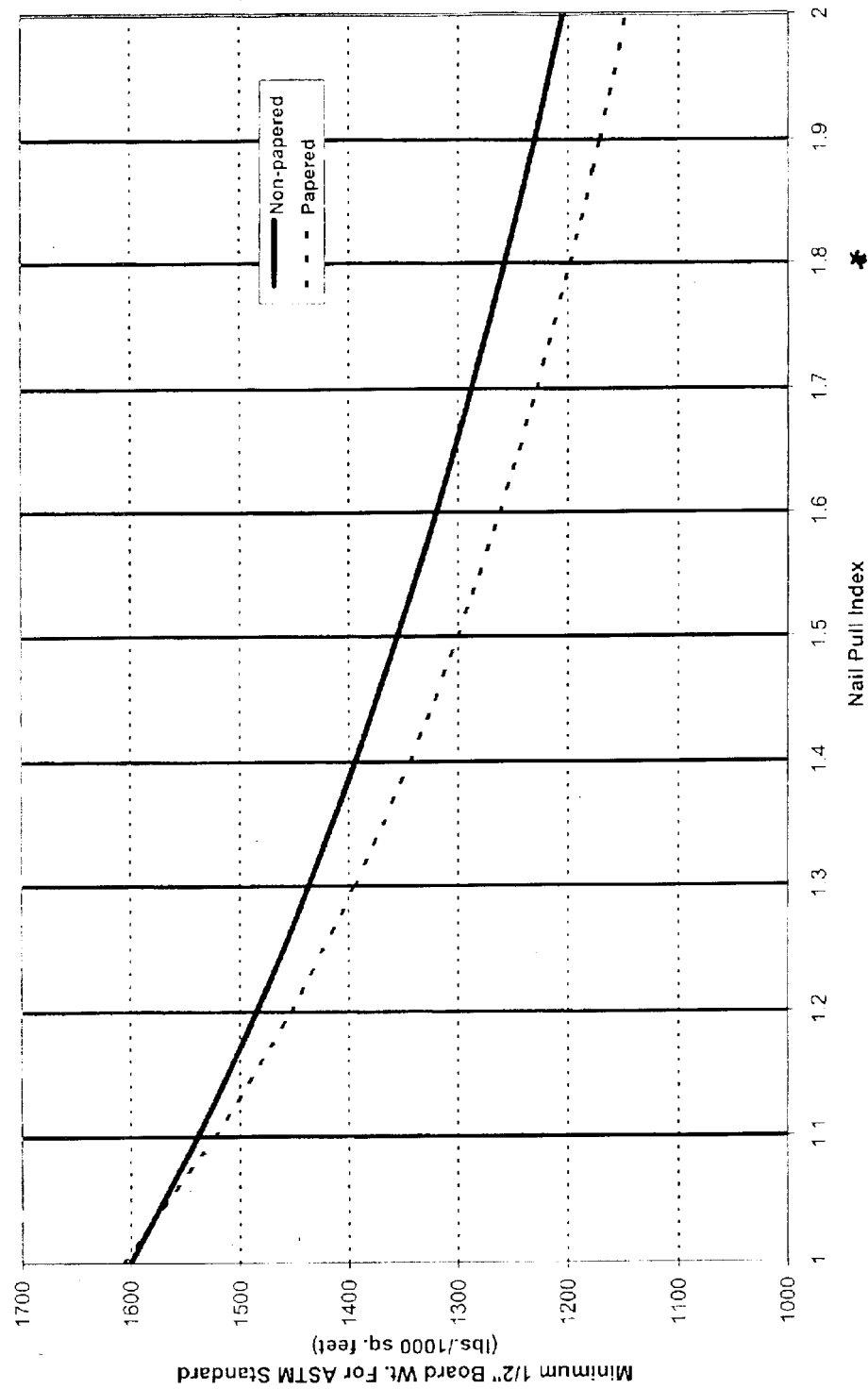
FIG. 4 shows a minimum board weight to satisfy ASTM Standard C473-95 for a ½ inch thick wallboard versus nail pull index for papered and non-papered wallboard.
Figure 7:
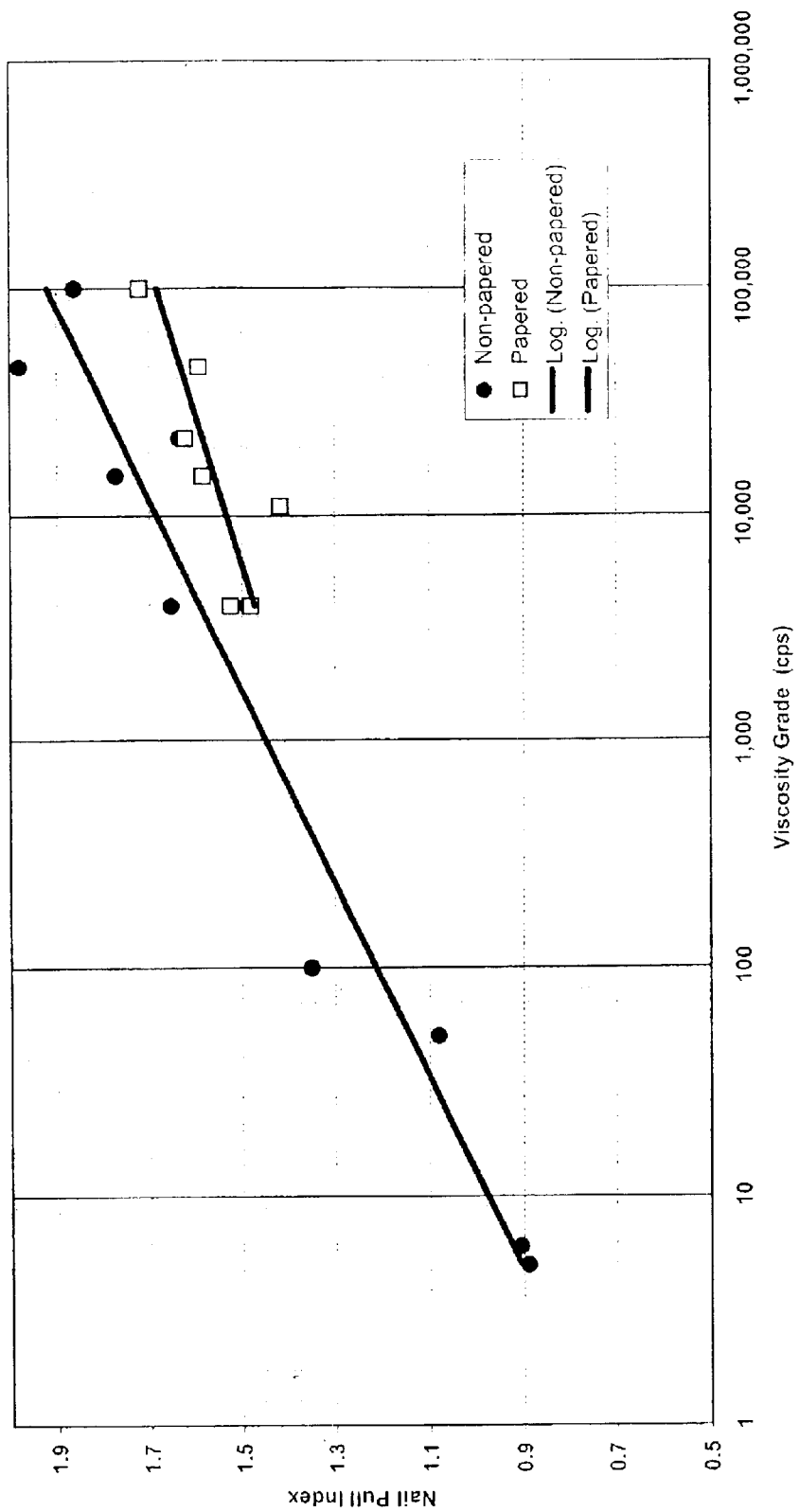
FIG. 7 shows the nail pull index versus viscosity grade for HPMC at a weight fraction of 1 g of HPMC per 100 g β-calcium sulfate hemihydrate with and without a paper backing.
Figure 15:
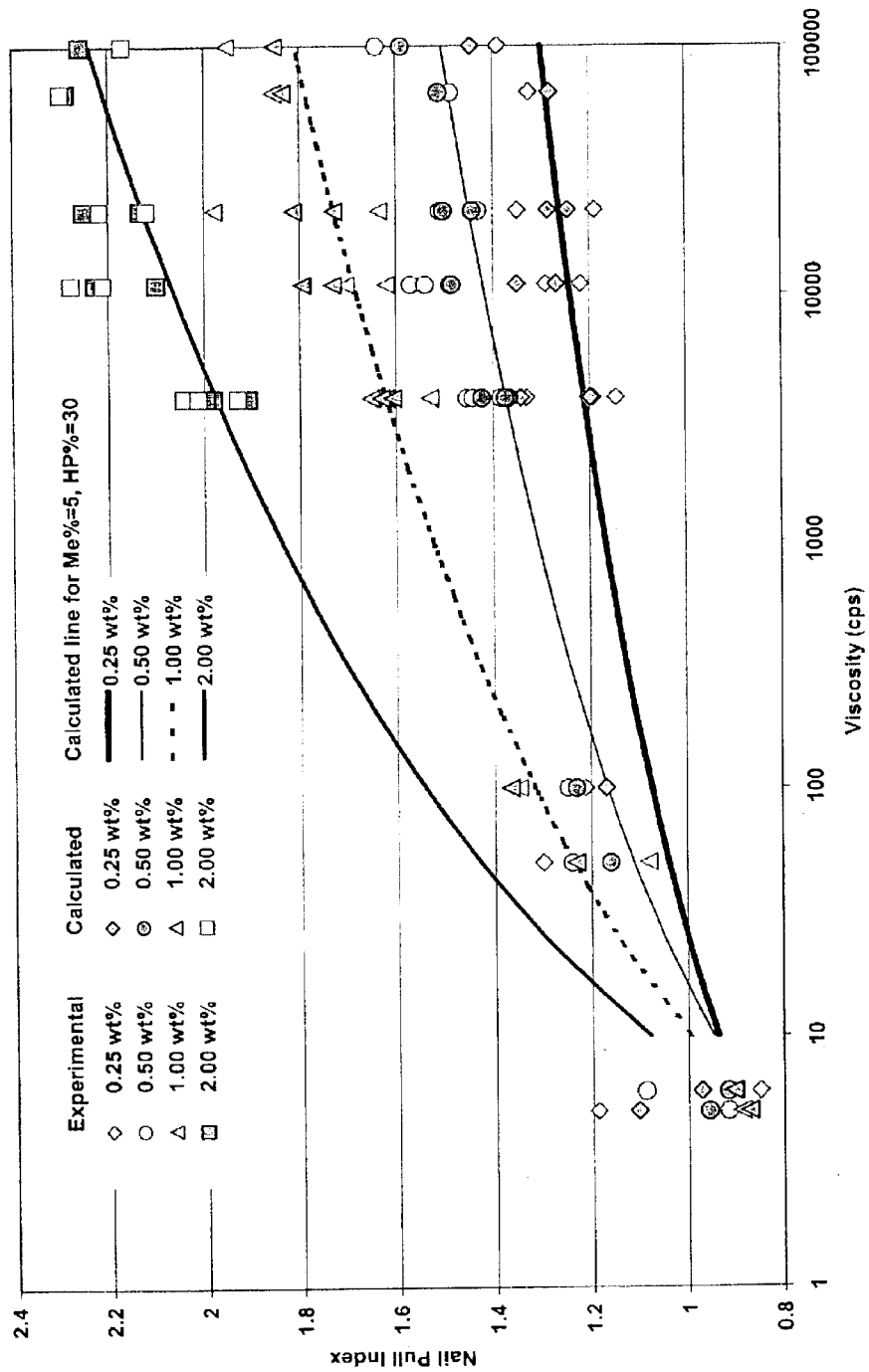
FIG. 15 shows the data and a correlation for the nail pull index versus viscosity grade for another embodiment comprising a paperless HPMC-reinforced wallboard.
Figure 16:
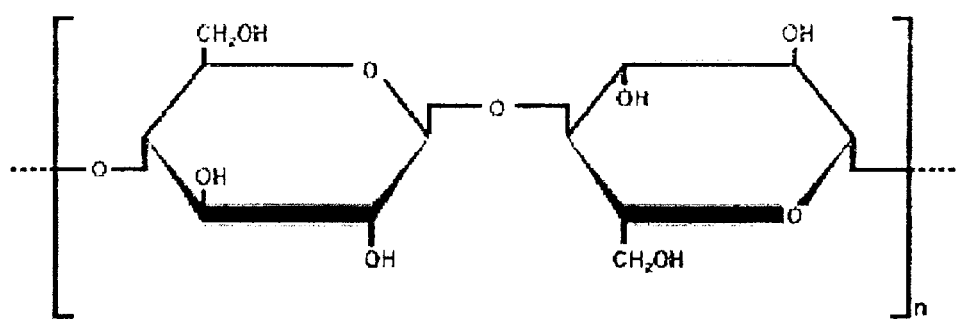
FIG. 16 shows the chemical formula for cellulose.
Figure 17:
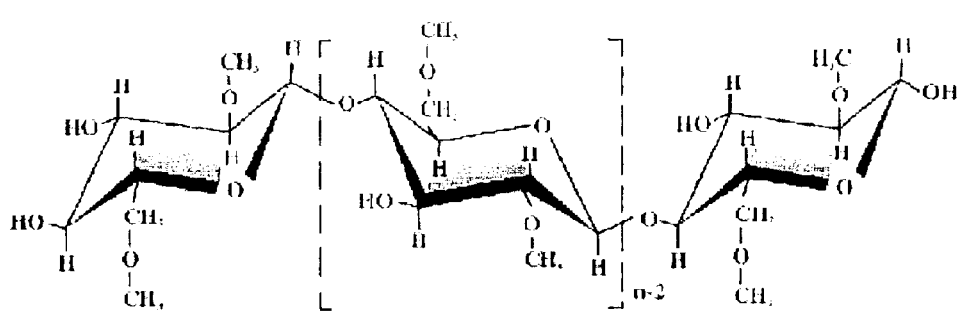
FIG. 17 shows the chemical formula of a methyl cellulose.
Figure 18:
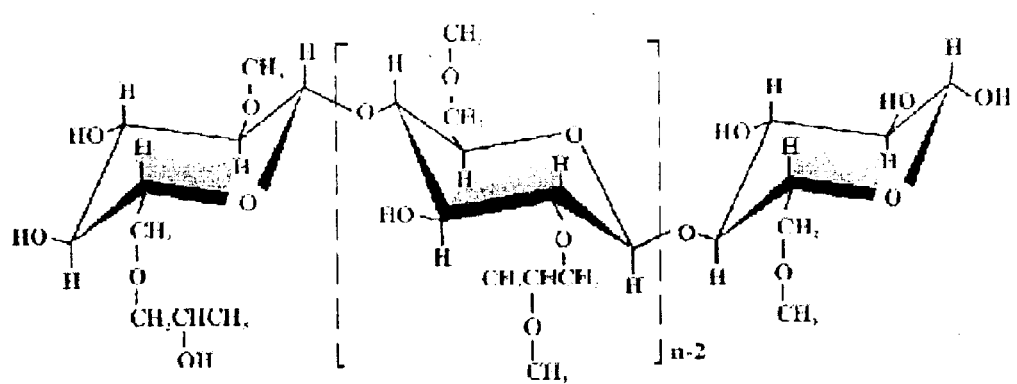
FIG. 18 shows the chemical formula of a hydroxypropyl methyl cellulose.

Preferably, the cellulose ethers used as additives to the wallboard slurry have a high molecular weight, which is associated with a high viscosity grade. Surprisingly, both nail pull resistance and flexural strength are greatly increased for specific cellulose ethers at particular molecular weights and viscosity grades, as shown in FIGS. 1 and 2. Also, it is very surprising that both nail pull index and flexural strength index increase rapidly with increasing molecular weight and viscosity grade for some cellulose ethers, for example as shown in FIGS. 7 and 15. This contradicts the earlier expectations of others in the field that relied on data from specimens prepared using stucco slurries using relatively low molecular weight additives, slurries of CMC, which do not show increasing nail pull resistance with weight fractions above about 0.25 wt %, and slurries prepared using processing methods that did not effectively disperse the cellulose ether powders. Furthermore, the present invention contradicts those references that indicated that high viscosity grades would weaken the gypsum crystal strength.

Specimens of high molecular weight and high viscosity grade HPMC reinforced wallboard and HEMC reinforced wallboard have the greatest value of nail pull index of those tested, as shown in FIG. 1. Other embodiments show greatly improved nail pull index, as well, especially using high viscosity grade cellulose ethers.

Figure 6:
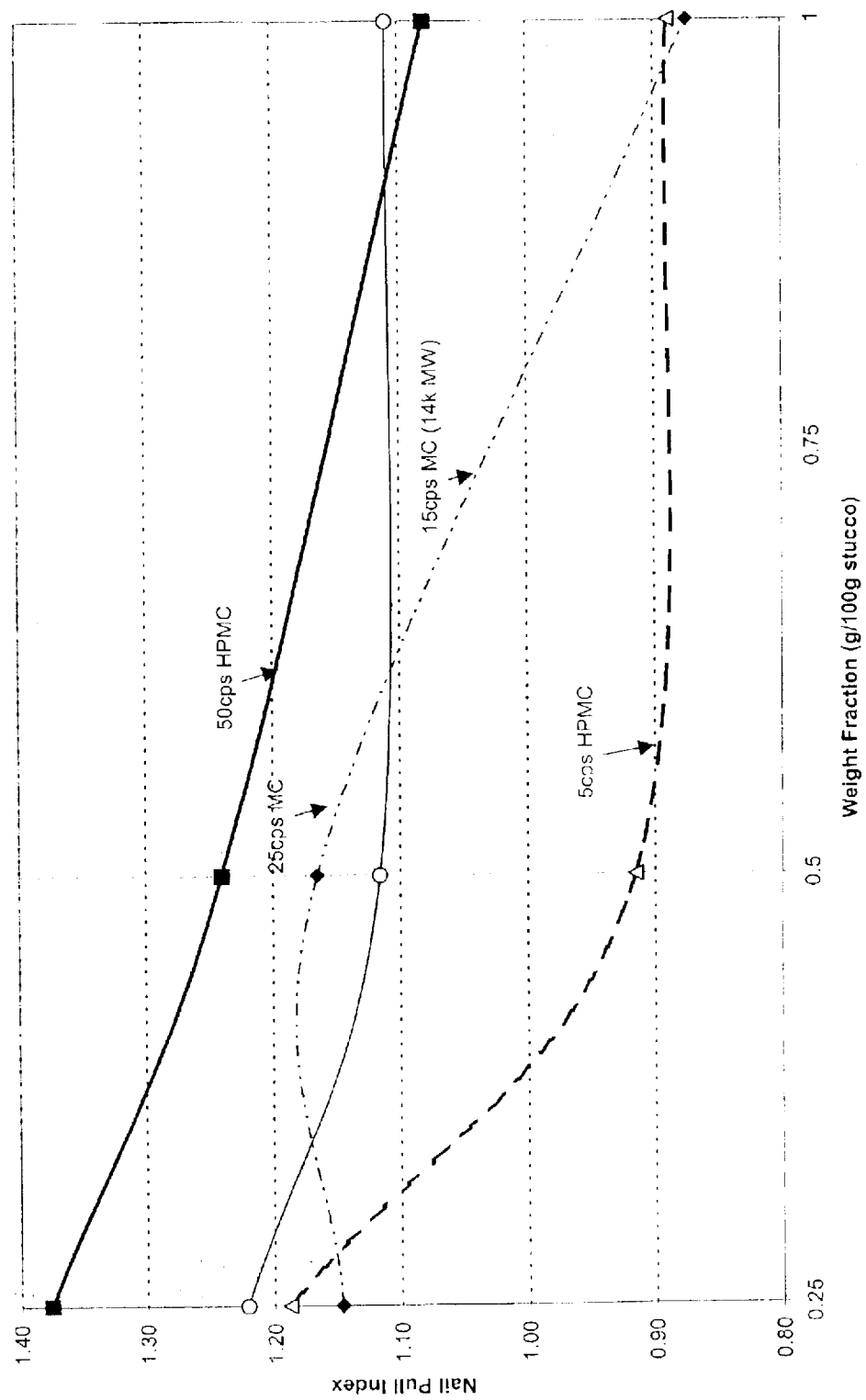
FIG. 6 shows the nail pull index versus weight fraction for several low viscosity cellulose ethers.
Figure 14:
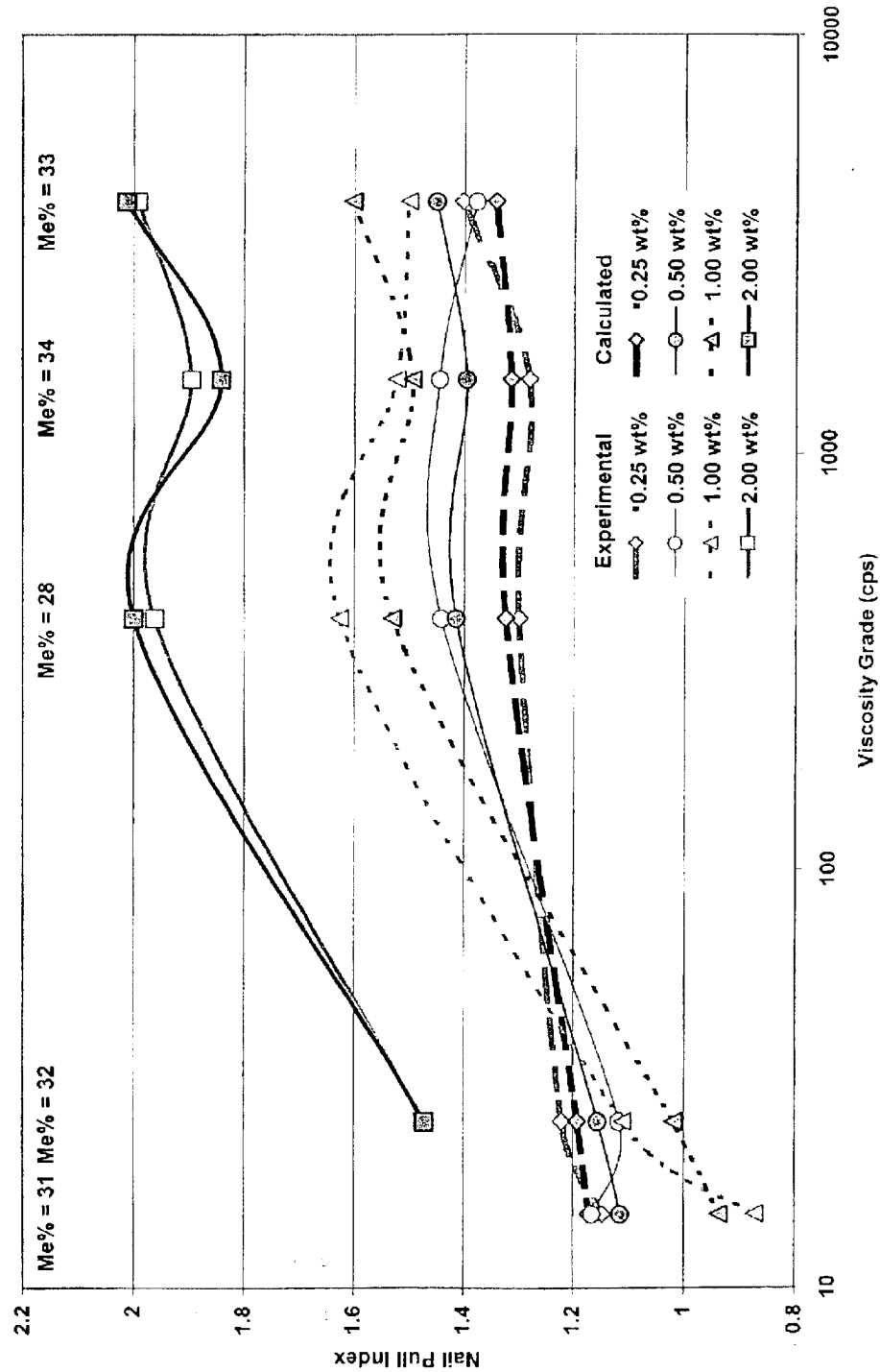
FIG. 14 shows the data and a correlation for the nail pull index versus viscosity grade for another embodiment comprising a paperless MC-reinforced wallboard.

However, the results for low molecular weight cellulose ethers was disappointing, as shown in FIGS. 6 and 14. As concentration of the cellulose ethers increased, the nail pull resistance decreased for low molecular weight cellulose ethers. Degradation of important properties with continued addition of an additive is highly disfavored in commercial processing, especially for an additive with a low overall weight fraction compared to other ingredients.

During a mixing process, increasing the weight fraction of the additive in the mixture is accomplished by merely adding more of the additive to a batch or continuous stream of the mixture. However, it is problematic to dilute the weight fraction of additive once too much additive is mixed with the base material, because it requires mixing large quantities of the base material, in this case β-calcium sulfate hemihydrate, into a mixture of additive and base material to dilute the weight fraction of additive. Thus, it is desirable for a robust mixing process to be able to allow an excess of additive without adversely affecting the properties of the finished product. Therefore, using an additive that continuously improves the properties of the product even with an inadvertent addition of excess additive is preferred. Even though the low molecular weight additives initially increase the nail pull resistance up to 0.25 wt %, the sharp decrease in properties with continued addition over a percent weight of 0.25 wt % makes them impractical for use in many commercial processes.

Figure 5:
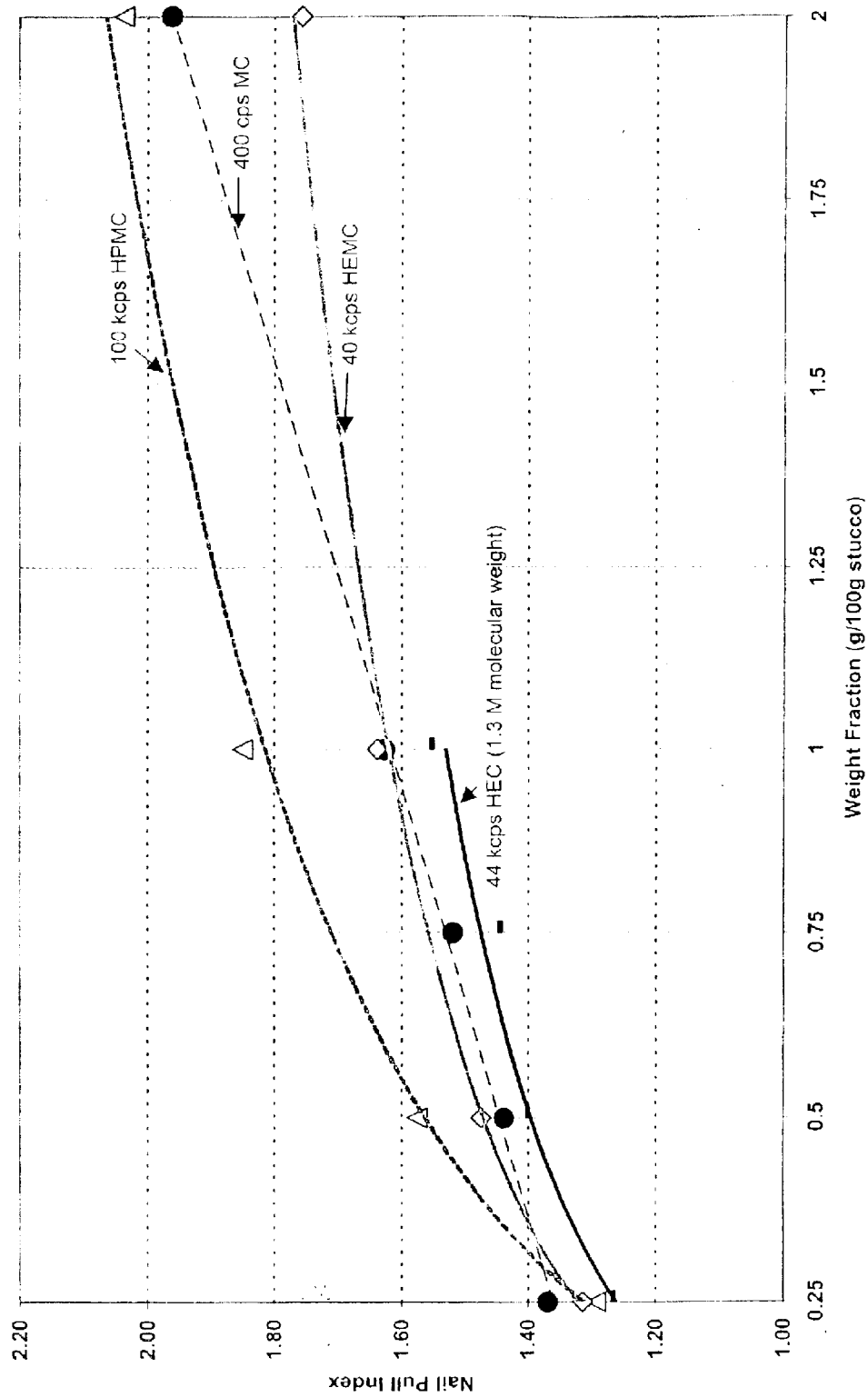
FIG. 5 shows the nail pull index versus weight fraction for several embodiments of the present invention.

FIG. 5 shows that for high molecular weight and high viscosity HPMC, HEMC, and HEC, the nail pull resistance increases logarithmically with the weight fraction of additive. This is a highly desirable trend, making for a robust and forgiving manufacturing process. 400 cps MC shows a linear increase in nail pull resistance with weight fraction of additive, which is also desirable.

CMC is one of the most commonly used cellulose ethers, but, in the absence of other cellulose ethers, CMC greatly retards setting time and reduces nail pull resistance and flexural strength compared to unreinforced specimens. As mentioned previously CMC does not increase the strength of wallboard at the concentrations, high molecular weights and viscosities that are effective for the other cellulose ethers. It is believed, without being limiting in any way, that other cellulose ethers tend to have molecular interactions via hydrogen bonding. Thus, it is believed that the high molecular weight molecules tend to be immobilized and do not segregate to the drying surfaces of the wallboard, as some other soluble polymers do. Therefore, high molecular weight molecules, having substantial hydrogen bonding interactions, remain dispersed throughout the wallboard core and reinforce the matrix of hydrated gypsum crystals.

A surface treatment may coat the cellulose ethers to delay the onset of dissolution, which would be expected to improve dispersion of the cellulose ethers in water. However, it is believed that, in practice, the delay in dissolution caused by the surface treatment results in incomplete dissolution of the surface treated cellulose ethers. Iodine stain tests showed that cellulose ethers that were surface treated did not disperse evenly throughout the wallboard specimen, especially for HEC surface-treated powders, while both untreated cellulose ethers and surface treated cellulose ethers that were pre-dissolved showed complete and even dispersion throughout the wallboard. One method of improving dispersion of untreated and surface-treated powdered cellulose ethers was to pre-mix the dry cellulose ethers until the powders were well dispersed with the dry β-calcium sulfate hemihydrate before adding the mixture to water. Thereby, the agglomeration of the cellulose ethers was reduced and dissolution occurred more readily than for agglomerated particles.

Figure 11:
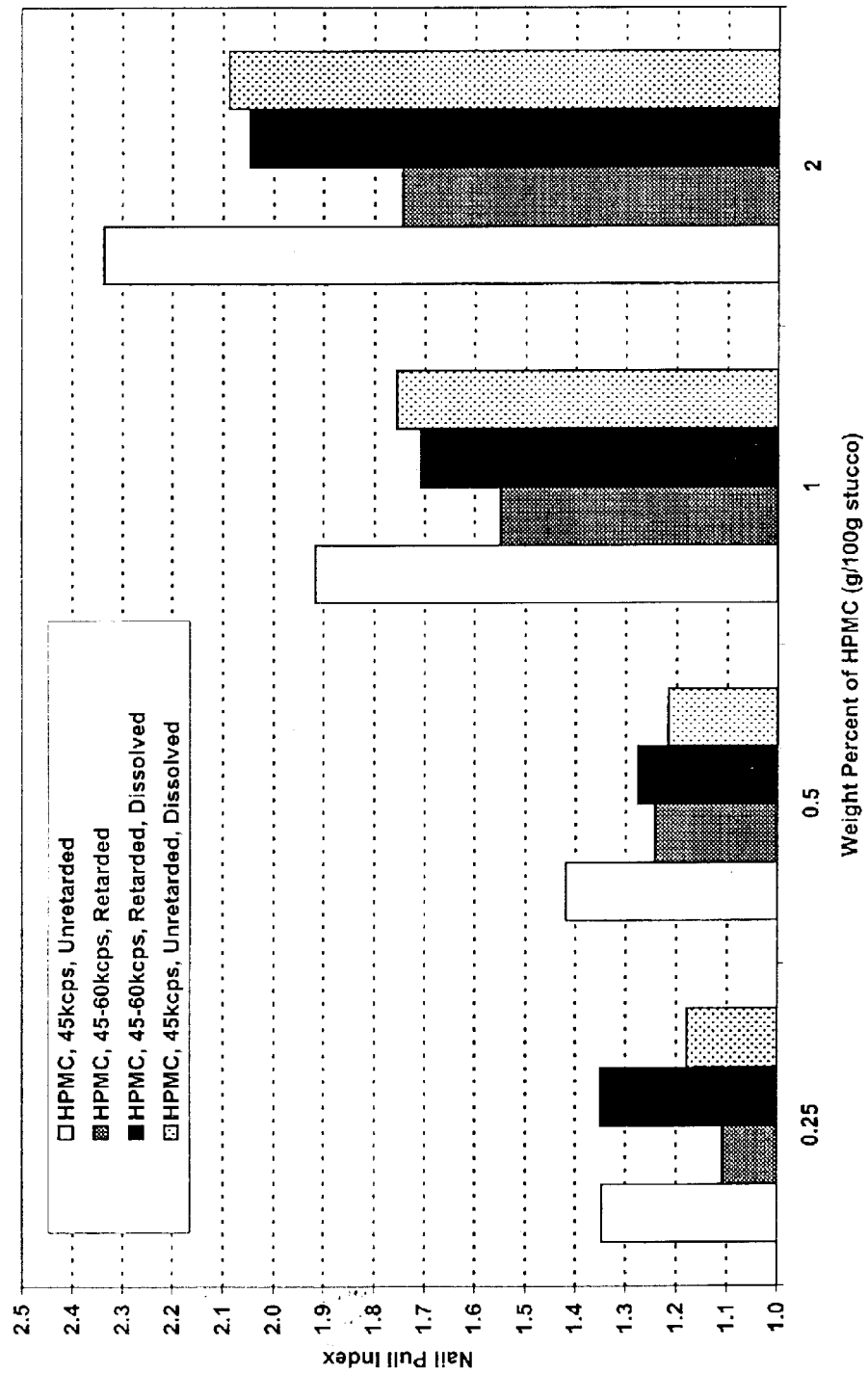
FIG. 11 shows the nail pull index versus weight fraction for four alternative embodiments comprising a paperless wallboard and a HPMC strengthening additive.
Figure 13:
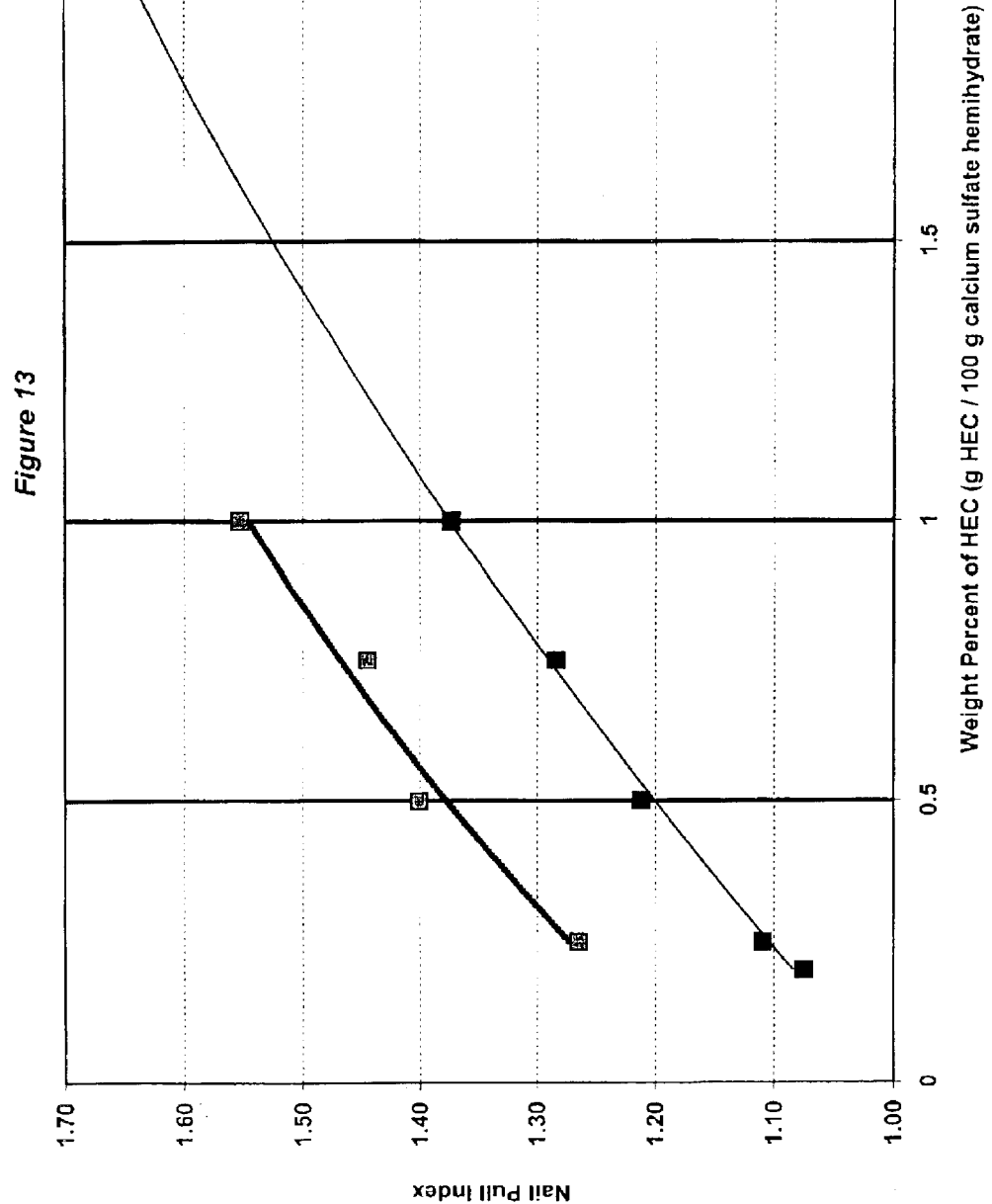
FIG. 13 shows the nail pull index versus weight fraction for two alternative embodiments of a HEC reinforced wallboard or ceiling board.

The nail pull index of surface treated cellulose ethers was less than the nail pull index of either pre-dissolved, surface treated cellulose ethers or untreated cellulose ethers, as shown in FIGS. 1 and 2, and as shown against weight fraction, for example in FIG. 11 for HPMC with a viscosity grade of 45,000 cps (45 kcps) and in FIG. 13 for HEC with a molecular weight of 1.3 million (1.3 M).

Figure 12:
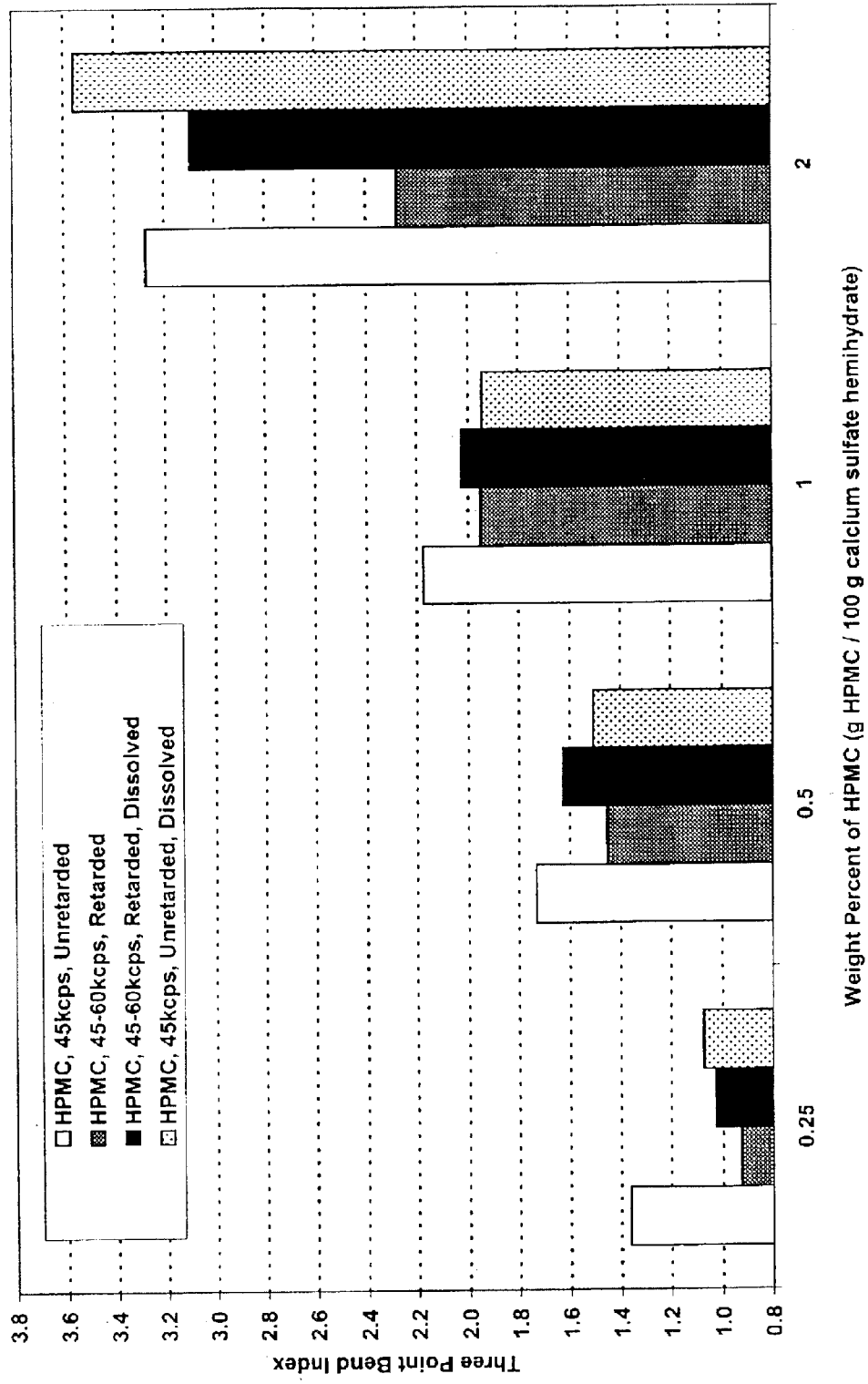
FIG. 12 shows the flexural strength index versus weight fraction for the same four embodiments as shown in FIG. 11.

The flexural strength is not affected as greatly by incomplete dissolution, as shown versus weight fraction in FIG. 12 for HPMC at 45 kcps. It is believed that the difference between the effects in nail pull index and flexural strength index is due to the fact that nail pull index is sensitive to crushing of the specimen core, while the flexural strength index is less sensitive to crushing of the specimen of the core (distributed stresses).

Figure 8:
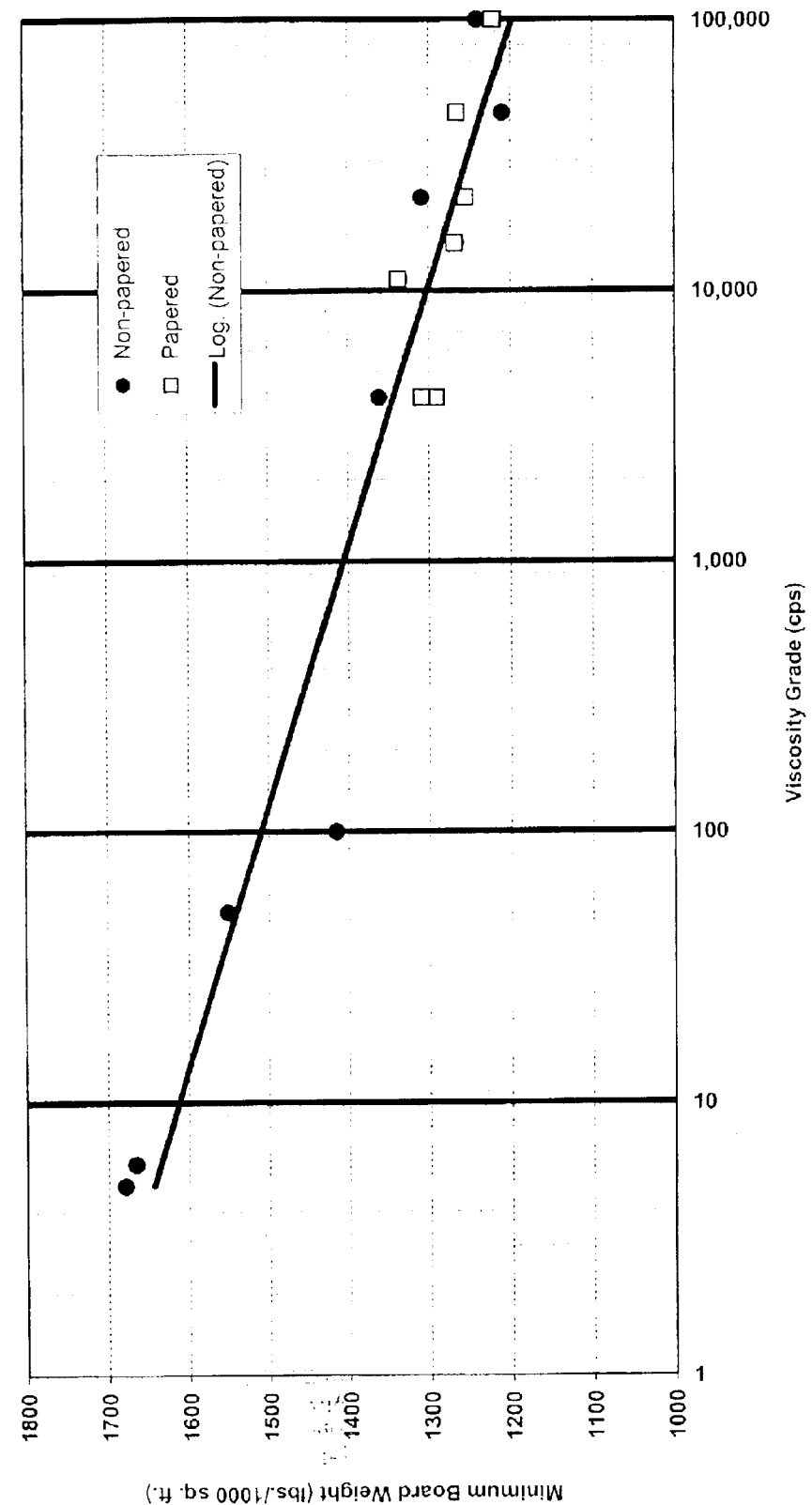
FIG. 8 shows the minimum board weight versus viscosity grade for HPMC at a weight fraction of 1 g of HPMC per 100 g β-calcium sulfate hemihydrate with and without a paper backing.

FIG. 8 shows the minimum board weight projected for meeting ASTM standards versus viscosity grade of wallboard specimens prepared with a weight percent of HPMC additive to β-calcium sulfate hemihydrate of 1 wt %. As the viscosity grade increases the minimum board weight that is required to pass ASTM standards decreases. It should be understood that any additional reinforcements, such as fiber reinforcements, that are added to the slurry can also increase the strength, particularly the flexural strength, of the wallboard. This would also tend to reduce the minimum board weight required to pass ASTM standards. For example, it is common practice to incorporate cellulose fibers into the wallboard core. Other fiber reinforcements, such as glass, polymer and carbon fibers, may also be added to increase the flexural strength of the wallboard core. In one specific embodiment, short polyester fibers or nylon fibers or both are mixed into the dry ingredients prior to adding the dry ingredients to water to increase the flexural strength. Longer fibers can be introduced during extrusion to provide the core with oriented strengthening along the longitudinal direction of the wallboard.

Slurry viscosity is a major concern in high speed wallboard production. Increased viscosity can lead to increased mixing and pumping demands, clogged machinery, and problems with board formation. Slurry viscosity is of even greater importance when selecting a CE additive because the primary purpose of CEs in conventional plaster formulations is to thicken the mixture.

In order to fully hydrate the β-calcium sulfate hemihydrate and prepare a slurry that can be mixed and extruded, a greater amount of water is used than is used for plaster compounds, which use hydration of α-calcium sulfate hemihydrate to form gypsum. It is known that the amount of water added to the slurry has a profound effect on the quality and microstructure of the resulting wallboard. It is believed, without limiting the invention in any way, that addition of too little water prevents adequate mixing of the slurry, while too much water causes undesired porosity in the wallboard core. There can be a dramatic increase in viscosity with the addition of CEs, especially in formulations with elevated levels of high viscosity CE, which can make it difficult to adequately mix the dry ingredients and the water. Furthermore, an increase in viscosity can prevent the slurry from being poured into a form. One simple test that can be used to determine slurry viscosity is a "patty test" in which some amount of slurry is poured from a designated height and the resulting patty diameter is recorded. Furthermore, the rheology of wallboard slurry is a function of time, humidity and temperature.

Figure 9:
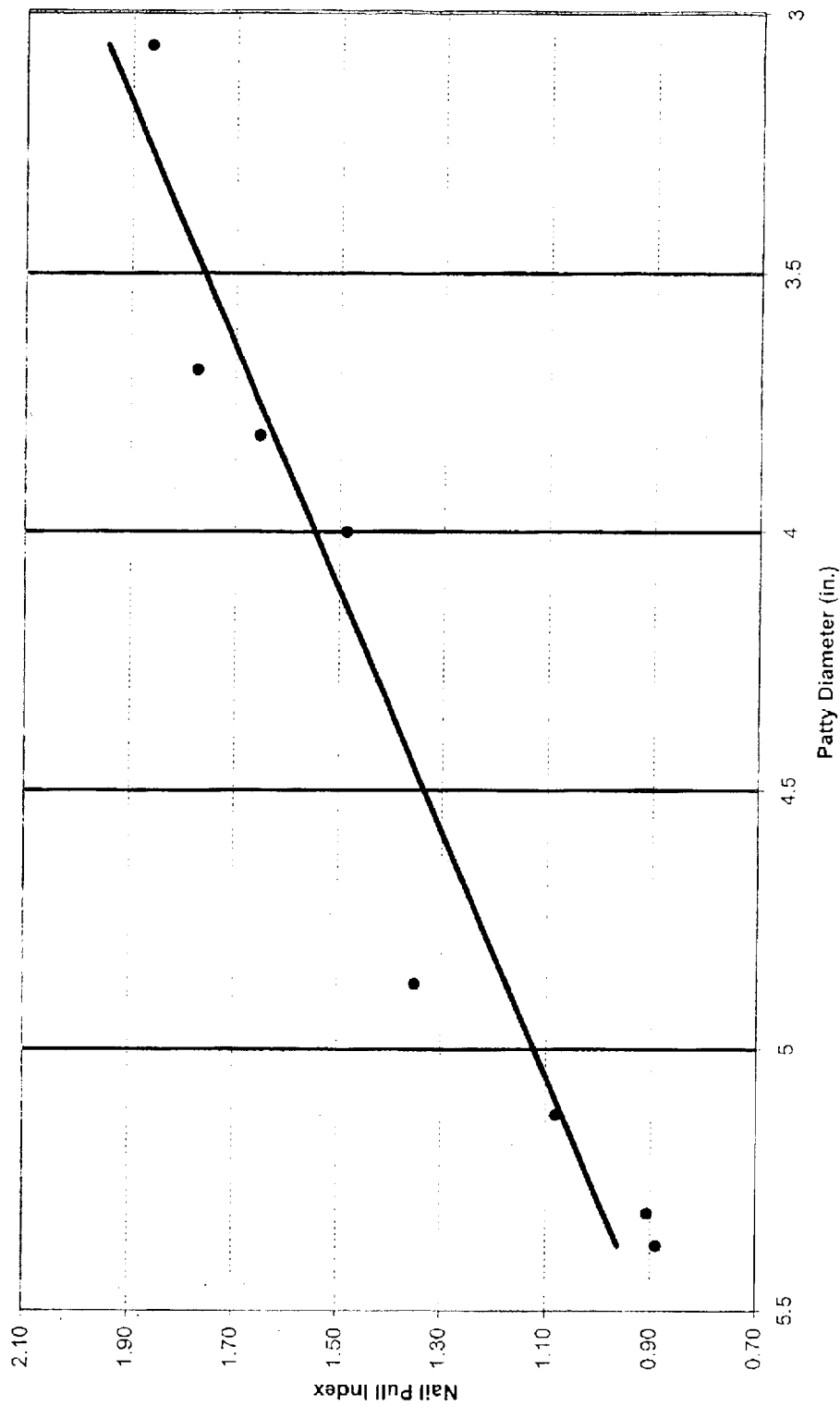
FIG. 9 shows the nail pull index versus patty diameter (an indicator of the viscosity that decreases with increasing viscosity) for HPMC.
Figure 10:
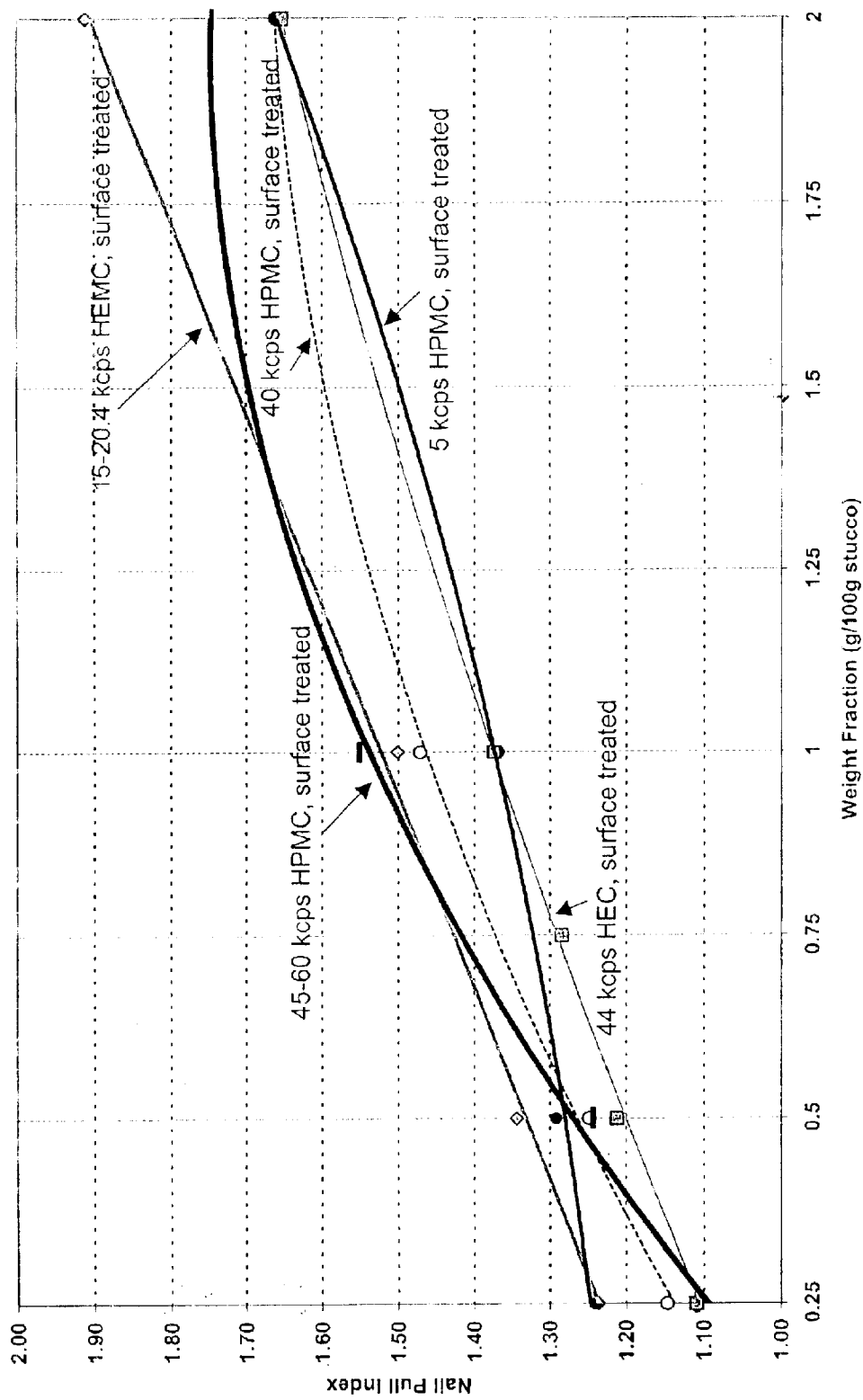
FIG. 10 shows the nail pull index versus weight fraction for several embodiments of the present invention having treated surfaces to delay dissolution.

In general, the patty size increases inversely with an increase in the viscosity grade of a cellulose ether. As expected, the patty diameter increases with decreasing viscosity grade for HPMC. In fact, patty diameter increases logarithmically with the inverse of viscosity grade; therefore, the nail pull index increases proportionally with the inverse of patty size, as shown in FIG. 9.

In one embodiment, a slurry was formed by mixing β-calcium sulfate hemihydrate with less than 5 wt % of a powdered cellulose ether, such that the cellulose ether was evenly dispersed throughout the mixture. The mixture was then mixed with an amount of water to form a slurry, such that the wallboard core had a density of less than 0.8 g/cc upon drying. In an alternative embodiment, the cellulose ether was selected to have a molecular weight of at least 20,000 and a viscosity grade of at least 100 cps, and both the nail pull resistance and flexural strength were improved compared to unreinforced wallboard. In another embodiment, the amount of powdered cellulose ether was limited to a range of 0.5 wt % to 3 wt %, and the measured nail pull index continuously increased with addition of powdered cellulose ether.

Figure 19:
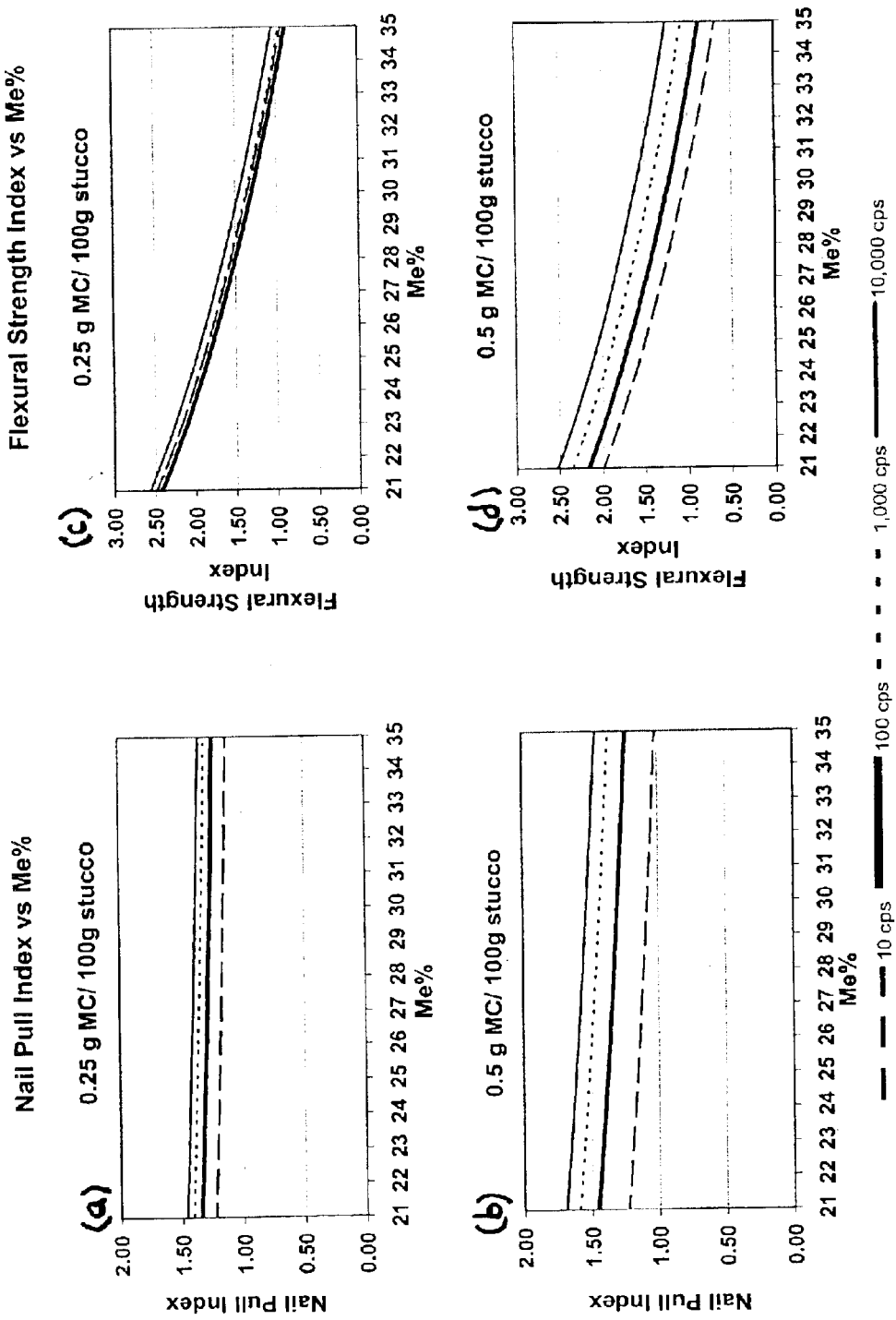
FIGS. 19 and 20, based on a correlation with data, show graphically the calculated effect of percent substitution of methyl groups in methyl cellulose on the nail pull index and flexural strength index for various viscosity grades and weight percent additions of methyl cellulose.
Figure 20:
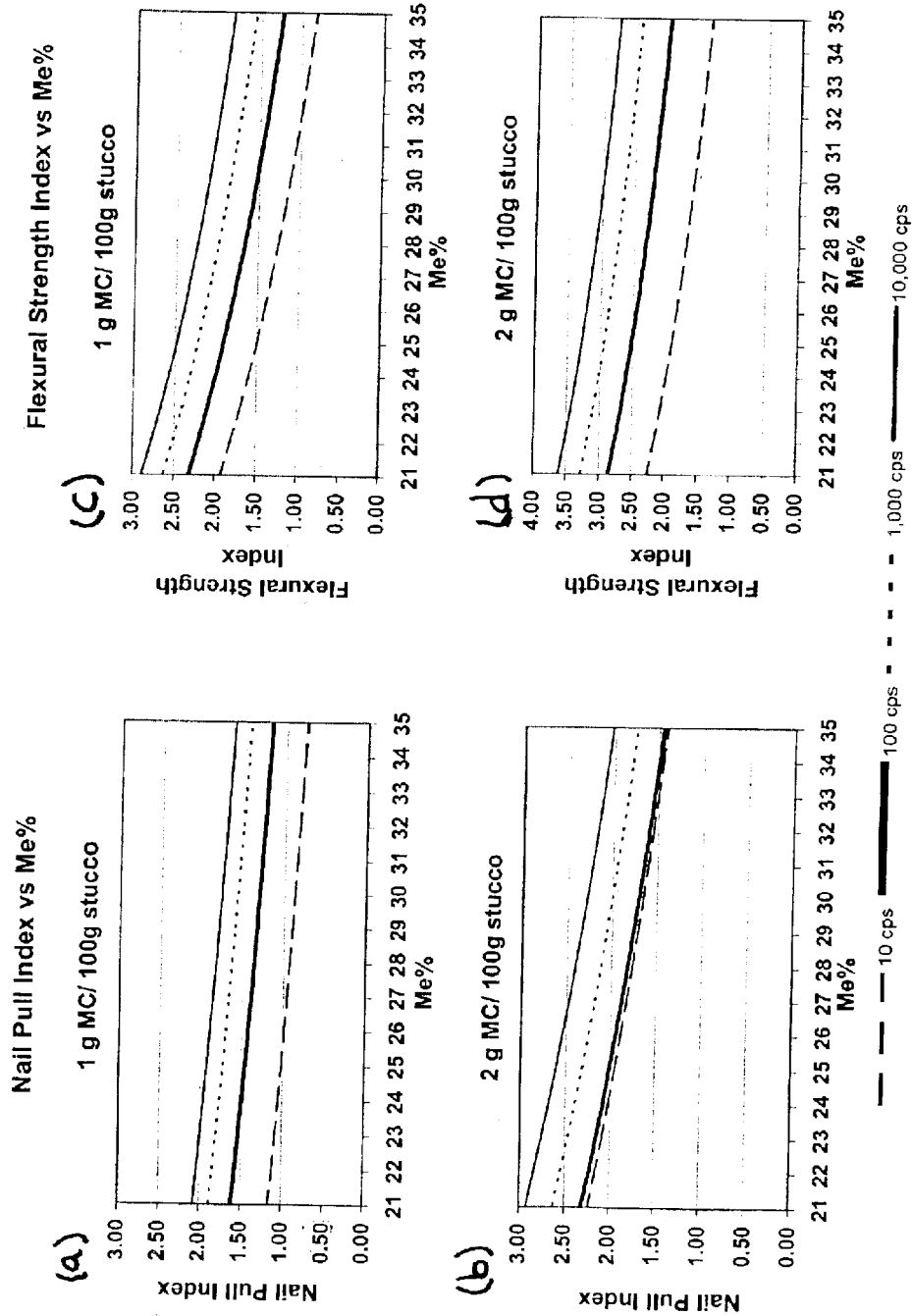

In yet another embodiment, the DS is limited to a range between 1.2 and 2.4 for a MC. In an alternative embodiment, the DS is limited to a range from 1.6 and 1.9 for a MC, having a viscosity grade of at least 10 cps, producing wallboard with improved nail pull index for viscosity grades of at least 100 cps, as shown in FIGS. 14 and 15, for example. FIG. 14 shows a graph of nail pull index versus MC viscosity grade with 0.25, 0.5, 1.0, and 2.0 wt % of MC mixed with powdered β-calcium sulfate hemihydrate. The darker lines and point are the values calculated using a correlation, which is discussed elsewhere, while the lighter lines are the experimental values. FIG. 15 is a similar graph for HPMC mixed with powdered β-calcium sulfate hemihydrate. In another alternative embodiment, a DS range from 1.2 to 1.6 for a MC, greatly increases the flexural strength index and increases the nail pull index for MC additions at a weight percent of 0.25 and 0.5 wt %, as shown in FIG. 19, which is based on the correlation used in FIG. 14. FIG. 20 shows that this trend applies also to higher weight percent additions of MC. This shows that increasing nail pull resistance occurs for wallboard processed using a MC with low DS, high viscosity grade and high molecular weight, high weight percent or a combination of these.

It is believed, without being limiting in any way, that hydrogen-bonding interactions immobilize the cellulose ether molecules, and the degree of hydrogen bonding is affected by molecular weight and is reflected in the viscosity grade. It is also affected by the degree of substitution. Thus, degree of substitution, viscosity grade and molecular weight of the cellulose ether are critical factors in selecting a specific cellulose ether as a strengthening additive, because it is believed that the strength of the wallboard depends on the distribution of cellulose ether molecules in the wallboard core and bonding interactions among the molecules. Furthermore, it is believed that the effect of bonding interactions depends on both the degree of substitution and the weight percent of the addition.

The percent substitution of specific cellulose ethers, which were used as reinforcing additives, were analyzed in accordance with standard test method ASTM D 3876; which is incorporated by reference herein in its entirety. ASTM D 3876 determines methoxyl and hydroxypropyl substitution in cellulose ether products by gas chromatography. The resolved substitution percentages of the various cellulose ethers, along with the viscosity grades taken from the literature, were compared to the mechanical testing results to determine the effect of the degree of substitution on flexural strength and nail pull resistance. Based on these empirical measurements, correlations were developed that relate the nail pull index and the flexural strength index to cellulose ether substitution pattern. The following regression models established the best correlation:

HPMC Nail Pull Index (NPI):

$$NPI = A_1 f^{X1} [(\log \gamma)^{X2} + A_2 M^{X3} + A_3 H^{X4}] + A_4 f^{X5} M^{X6} H^{X7} (\log \gamma)^{X8} + A_5$$

MC Nail Pull Index (NPI):

$$NPI = B_1 f^{Y1} + B_2 f^{Y2} (\log \gamma)^{Y3} + B_3 f^{Y4} M^{Y5} (\log \gamma)^{Y6} + B_4$$

MC Flexural Strength Index (TPBI)

$$MC\ TPBI = C_1 f^{Z1} C_2 f^{Z2} (\log \gamma)^{Z3} + C_3 f^{Z4} M^{Z5} + C_4 f^{Z6} M^{Z7} (\log \gamma)^{Z8} + C_5$$

wherein:

γ=cellulose ether viscosity grade (cps) (2% Ubbelohde)

M=cellulose ether methoxyl percent substitution

H=cellulose ether hydroxypropyl percent Substitution f=cellulose ether wt % (g/100 g stucco)

wherein $A_i$, $B_i$, $C_i$, $X_i$, $Y_i$, and $Z_i$ are defined in Table 2. These empirical correlations are useful in defining the effect of each of the weight percentage of cellulose ether (f), the degree or percent of substitution of the methyl (M) and hydoxypropyl (H) groups, and the viscosity grade (γ) on the nail pull index and flexural strength index of wallboard core reinforced by MC and HPMC.

Specifically, there is a correlation of the amount of cellulose ether additive in the wallboard core and the nail pull index and flexural strength index. As expected, the nail pull resistance increases with increasing weight percent of additive. There is also a correlation with viscosity grade. Surprisingly, the data shows that increasing viscosity grade increases the nail pull index for HPMC and MC, which was not reflected in the literature or in some of the raw data, for example, as shown in FIG. 14 for MC.

Finally, there is a very surprising and unexpected correlation with the percent substitution. Specifically, the nail pull index increases with decreasing degree of substitution (DS), as show in FIGS. 19 and 20 for MC, for example. This unexpected and surprisingly strong correlation is sufficient to cause the dramatic dip in the nail pull index versus viscosity grade curve as shown in FIG. 14, for example. In FIG. 14, the commercially available MC had a percent substitution of methyl groups of 34%. Furthermore, this effect has gone unnoticed by others, which has probably discouraged others from adding cellulose ethers to wallboard as a strengthening additive. Specifically, the DS is often not reported for commercial cellulose ethers. If reported, it is often highly inaccurate. Thus, to perform this analysis, it was necessary to independently measure the percent substitution by gas chromatography. In the range of weight percent most practical for wallboard, e.g. less than 5 wt %, more preferably less than 3 wt %, even moderate increases in DS dramatically decrease the measured flexural strength index of wallboard compared to lower DS, as shown in FIGS. 19 and 20.

For low viscosity grade cellulose ethers, the difference in the measured index of nail pull and flexural strength is often the difference between a decrease compared to no reinforcement in the wallboard and a dramatic increase compared to no reinforcement, as shown in FIGS. 19 and 20. Furthermore, commercially available cellulose ethers typically have relatively high values of DS, as compared to the DS associated with the limit in solubility of the cellulose ethers. Thus, it is not surprising that cellulose ethers have been overlooked as an additive for strengthening β-calcium sulfate hemihydrate based wallboard products. Indeed, the most promising cellulose ethers, for example MC with a DS in the range from 1.2 to 1.6, have not been readily available for testing as strengthening additives.

The HPMC nail pull performance correlation exhibits a different relationship with methoxyl substitution percentage, which has a much lower range in commercially available HPMC than in commercially available MC. At low additive levels, decreasing methyl DS does increase the nail pull index; however, at higher additive levels reducing the methyl DS is less effective, according to the correlations. This trend is affected somewhat by the choice of viscosity grade and by hydroxypropyl substitution percentage. However, given the data currently available, the degree of hydroxypropyl substitution does not influence the nail pull index as dramatically as methoxyl substitution in MC. These effects are reflected in the scattered data of FIG. 15.

In another alternative embodiment, a foam may be produced to further reduce the density of the wallboard core. This foam may be produced, for example, using a surfactant and stirring of the water and/or slurry to generate a foam, which may be incorporated into the extruded wallboard core.

SPECIFIC EXAMPLES

Control Sample. One hundred grams of β-calcium sulfate hemihydrate was dry mixed with 0.13 g ground gypsum accelerator. The β-calcium sulfate hemihydrate was then added to 150 g of room-temperature tap water in a 500 mL Waring blender. The slurry was blended at low speed for 15 seconds. The slurry was then immediately poured into an approximately 7"×2"×½" mold. After about 20 minutes, the sample was removed from the mold and placed in a convection oven at 45° C. in which it was dried for at least 36 hrs. After removal from the oven, the sample was cut to 5"×2" and massed and dimensioned. This data was used to calculate sample density. The flexural strength was attained using a three-point-bend test similar to the ASTM C473 flexural strength test (method B) for gypsum wallboard. An Instron mechanical testing system with data acquisition software was used to determine mechanical behavior. The flexural failure stress was calculated from the failure load, testing configuration, and sample geometry. The two half samples remaining from the bending test were tested for resistance to nail pull. A nail pull test based on ASTM C473 nail pull test (method B) was used. The resulting sample had a density of 0.63 g/cc, a flexural strength of 242 psi, and a nail pull resistance of 46 lbs.

High Viscosity HPMC Enhancing Agent; Paperless Sample. One hundred grams of β-calcium sulfate hemihydrate was dry mixed with 0.13 g ground gypsum accelerator and 1 g HPMC (100 kcps purchased from Aldrich Chemical Co.). The dry mixture was then added to 150 g of tap water in a 500 mL Waring blender. The slurry was blended at low speed for 15 seconds. The slurry was then immediately poured into a 7"×2"×½" mold where it set for about 20 minutes before being removed. The sample was placed in a convection oven at 45° C. for at least 36 hrs. After removal from the oven, the sample was cut to 5" long, massed, and dimensioned. The density was calculated and the sample was tested for flexural strength and nail pull resistance on an Instron mechanical testing system. The sample had a density of 0.46 g/cc, a flexural strength of 299 psi, and a nail pull resistance of 43 lbs.

High Viscosity, RETARDED HEMC Enhancing Agent; Paperless Sample. One hundred grams of β-calcium sulfate hemihydrate was dry mixed with 0.13 g ground gypsum and 1 g of retarded HEMC (15–20, 5 kcps, purchased from Aldrich Chemical Co.). The dry mixture was then added to 150 g of tap water in a 500 mL Waring blender. The slurry was blended at low speed for 15 seconds. The slurry was then immediately poured into a 7"×2"×½" mold and, after 20 minutes, removed. The sample was placed in a convection oven at 45° C. for at least 36 hrs. After removal from the oven, the sample was cut to 5" long, massed, and dimensioned. The density was calculated and the sample was tested for flexural strength and nail pull resistance on an Instron mechanical testing system. The resulting sample had a density of 0.63 g/cc, a flexural strength of 545 psi, and a nail pull resistance of 78 lbs.

High Viscosity HPMC Enhancing Agent; Lightweight Wallboard. A papered sample was prepared by mixing 1 kg of β-calcium sulfate hemihydrate with 1.3 g ground gypsum and 10 g of HPMC (22 kcps, purchased from Aldrich Chemical Co.). To a 5 liter Waring blending container was added 1.5 kg of room-temperature tap water, 20 drops of Daxad 19LKN (dispersant) from Dow, and 10 drops of a 40% solution of diethylenetriaminepentaacetic acid sodium salt (retarder). The powder was added to the water and blended on high for 15 seconds. The slurry was then poured into an approximately 12"×12"×½" mold lined with an envelope made of standard decorative wallboard facing paper. The sample was removed from the mold after 15 minutes and placed in a 45° C. convection oven for 48 hrs. The sample was then removed and cut into 5"×2" and 9"×2" specimens, with the long dimension in the direction of the fibers of the paper. These specimens were then massed and measured. The density was calculated and the specimens were tested for flexural strength in the fiber direction and nail pull resistance on an Instron mechanical testing system. The sample had a density of 0.47 g/cc, a flexural strength of 822 psi, and a nail pull resistance of 75 lbs.

MC with 1:1 water:β-calcium sulfate hemihydrate ratio by weight. 100 parts of β-calcium sulfate hemihydrate was mixed with 9 parts of methyl cellulose (Aldrich, MW 17,000, viscosity grade 25 cps). The mixture was then added to 100 parts of water at room temperature and blended at a high shear setting for approximately 15 seconds. The resulting slurry was highly viscous, failing to pour into the form. A spatula was used to transfer, in small portions, enough slurry to be pressed into a form measuring 2 inches by 5 inches by 0.5 inches. After setting, the mixture was removed from the mold and cured at 45° C. for 2 days. The resulting sample has a density of 0.72 g/cc, a nail pull index of 1.87 (121 lbs.) and flexural strength of 881 lb/in$^2$.

MC with 1:1 water:β-calcium sulfate hemihydrate ratio by weight. 100 parts of β-calcium sulfate hemihydrate was mixed with 9 parts of methyl cellulose (Aldrich, MW 14,000, viscosity grade 15 cps). The mixture was then added to 100 parts of water and blended at high shear setting for approximately 15 seconds. The resulting slurry was highly viscous, failing to pour into the form. A spatula was used to transfer, in small portions, enough slurry to be pressed into a from measuring 2 inches by 5 inches by 0.5 inches. After setting, the mixture was removed from the mold and cured at 45° C. for 2 days. The resulting sample had a density of 0.74 g/cc, a nail pull index of 1.75 (119 lbs.) and flexural strength of 864 lb/in$^2$.

MC with 1:1 water:β-calcium sulfate hemihydrate ratio by weight. 100 parts of β-calcium sulfate hemihydrate was mixed with 9 parts of methyl cellulose (Aldrich, MW 40,000, viscosity grade 400 cps). The mixture was then added to 100 parts of water and blended at a high shear setting. The viscosity was exceedingly high and mixing was not possible for the desired 15 second duration. The powdered mixture was not fully incorporated into the slurry. The mixture prematurely set and could not be transferred to a form.

MC with 1:1 water:β-calcium sulfate hemihydrate ratio by weight. A subsequent specimen was prepared by reducing the amount of methyl cellulose by mixing 100 parts of β-calcium sulfate hemihydrate with 5 parts methyl cellulose instead of 9 parts methyl cellulose. The mixture was then added to 100 parts of water and blended at high shear setting for approximately 15 seconds. The resulting slurry was extremely viscous, beginning to set prematurely during mixing and failing to pour into the form. A spatula was used to transfer, in small portions, enough slurry to be pressed into a form measuring 2 inches by 5 inches by 0.5 inches. After setting, the mixture was (removed from the mold and cured at 45° C. for 2 days. The resulting sample had a density of 0.73 g/cc, a nail pull index of 1.54 (103 lbs.) and a flexural strength of 766 lbs./in².

Low Viscosity Grade HPMC with 1:1 water:β-calcium sulfate hemihydrate ratio by weight. 100 parts of β-calcium sulfate hemihydrate was mixed with 9 parts of HPMC (Aldrich, MW 10,000, viscosity grade 5 cps). The mixture was then added to 100 parts of water and blended at high shear setting for approximately 15 seconds. The resulting slurry poured directly into a form measuring 2 inches by 5 inches by 0.5 inches. After setting, the mixture was removed from the mold and cured at 45° C. for 2 days. The resulting sample had a density of 0.63 g/cc, a nail pull index of 1.26 (58 lbs.) and a flexural strength of 675 lb/in².

Low Viscosity Grade HPMC with 1:1 water:β-calcium sulfate hemihydrate ratio by weight. 100 parts of β-calcium sulfate hemihydrate was mixed with 9 parts of HPMC (Aldrich, MW 10,000, viscosity grade 6 cps). The mixture was then added to 100 parts of water and blended at high shear setting for approximately 15 seconds. The resulting slurry poured directly into a form measuring 2 inches by 5 inches by 0.5 inches. After setting, the mixture was removed from the mold and cured at 45° C. for 2 days. The resulting sample had a density of 0.59 g/cc, a nail pull index of 1.18 (47 lbs.) and a flexural strength of 535 lb/in².

Moderate Range Viscosity Grade HPMC with a water:β-calcium sulfate hemihydrate ratio of 1.0 by weight. First, 100 parts of β-calcium sulfate hemihydrate was mixed with 9 parts of HPMC (Aldrich, MW 12,000, viscosity grade 80–120 cps). The mixture was then added to 100 parts of water and blended at high shear setting for approximately 15 seconds. The resulting slurry was exceedingly viscous, prematurely setting during mixing and failing to pour into the form. A spatula was used to transfer, in small portions, enough slurry to fill a form measuring 2 inches by 5 inches by 0.5 inches. After setting, the mixture was removed from the mold and cured at 45° C. for 2 days. The resulting sample had a density of 0.75 g/cc, a nail pull index of 1.54 (121 lbs.) and a flexural strength of 652 lb/in².

High viscosity, surface-treated HEMC. A paperless sample was prepared by mixing 1.3 kg of β-calcium sulfate hemihydrate with 1.69 g ball mill ground gypsum (accelerator) and 26 g of retarded HEMC (viscosity grade of 15–20.5 kcps at 2 wt %, purchased from Aldrich Chemical Co.). The liquid components, 1.68 kg room temperature tap water, 26 drops Daxad 19LKN (dispersant) from Dow, and 13 drops 40% solution of diethylenetriaminepentacetic acid sodium salt (retarder), were added to a 5 liter Waring blender. The dry ingredients were added to the water and blended on high for 15 seconds, forming a slurry. The slurry was then poured into an approximately 12"×12"×½" glass mold with a thin teflon sheet on one face to facilitate removal. The sample was removed from the mold after 15 minutes and placed in a 45° C. convection oven for 48 hrs. The sample was then removed and cut into 5"×2" specimens. These specimens were then weighed and measured. The densities of nine specimens were calculated and the specimens were tested for flexural strength and nail pull resistance on an Instron Mechanical testing system using the methods previously described. The board had an average density of 0.64 g/cc, a flexural strength of 809 psi, and a nail pull resistance of 102 lbs., passing ASTM flexural strength and nail pull requirements.

High viscosity, surface-treated HEMC. A paperless sample was prepared by mixing 100 g of β-calcium sulfate hemihydrate with 0.13 g ball mill ground gypsum (accelerator) and 1 g of retarded HEMC (viscosity grade of 15–20.5 kcps at 2 wt %, purchased from Aldrich Chemical Co.). The mixture was then added to 150 g of water and blended on high for 15 seconds, forming a slurry. The slurry was then poured into an approximately 7"×2"×½" mold. The sample was removed from the mold after 15 minutes and placed in a 45° C. convection oven for 48 hrs. The sample was then removed and cut to 5"×2". The density of sample was calculated and it was tested for flexural strength and nail pull resistance on an Instron mechanical testing system using the methods previously described. The wallboard specimen had an average density of 0.63 g/cc, a flexural strength of 545 psi, and a nail pull resistance of 78 lbs., passing the ASTM nail pull requirement.

High-viscosity, surface-treated HEMC. A paperless wallboard is prepared using the following procedure. First, 150 g of β-calcium sulfate hemihydrate is dry mixed with 0.2 g ground gypsum and 3 g of surface-treated (retarded dissolution) HEMC (15–20.5 kcps, purchased from Aldrich Chemical Co.). The dry ingredients are added to 162 g of tap water in a 500 mL Waring blender, forming a slurry. The slurry is blended at low speed for 15 seconds. The slurry is then immediately poured into a 7"×2"×½" mold and, after 20 minutes, removed. The wallboard specimen is placed in a convection oven at 45° C. for at least 36 hrs for drying. After removal from the oven, the sample is trimmed to 5" long, weighed and dimensioned. A specimen prepared according to this procedure had a density of 0.80 g/cc, a flexural strength of 975 psi, and a nail pull resistance of 180 lbs., exceeding ASTM standards for flexural strength and nail pull resistance for ½-inch wallboard.

High viscosity, surface-treated HEMC. A paperless wallboard is prepared using the following procedure. First, 150 grams of β-calcium sulfate hemihydrate is dry mixed with 0.2 g ground gypsum and 3 g of surface-treated HEMC (15–20.5 kcps, purchased from Aldrich Chemical Co.). The dry ingredients are then added to 150 g of tap water in a 500 mL Waring blender, forming a slurry. The slurry is blended at low speed for 15 seconds. The slurry is then immediately poured into a 7"×2"×½" mold and, after 20 minutes, removed. The wallboard specimen is placed in a convection oven at 45° C. for at least 36 hrs for drying. After removal from the oven, the specimen is cut to 5" long, weighed and dimensioned. A specimen prepared according to the foregoing procedure had a density of 0.85 g/cc, a flexural strength of 989 psi, and a nail pull resistance of 203 lbs., exceeding the ASTM standards for flexural strength and nail pull resistance for ½-inch wallboard.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

TABLE I

| Man. | Catalog # | Viscosity Grade (cps) (wt. %-Method) | Surf. Treat. | Average Mn | D.S. | M.S. | Me % | HE % | HP % | Me % exp | HP % exp |
|---|---|---|---|---|---|---|---|---|---|---|---|
| | | | | HEC | | | | | | | |
| Aldrich | 43,498-1 | 3,400–5,000 (1% Brookfield) | Y | 1,300,000 | 1.5 | 2.5 | — | — | — | — | — |
| Aldrich | 43,497-3 | 4,500–6,500 (2% Brookfield) | Y | 720,000 | 1.5 | 2.5 | — | — | — | — | — |
| Aldrich | 30,863-3 | 80–125 (2% Brookfield) | ? | 250,000 | 1 | 2 | — | — | — | — | — |
| | | | | HEMC | | | | | | | |
| Aldrich | 43,501-5 | 15,000–20,500 (2% Brookfield) | Y | — | 1.6–1.9 | 0.25–0.5 | 26 | 8 | — | — | — |
| Aqualon | Culminal MHEC 25k Pl | 25,000 cps (2% Brookfield) | N | — | 1.6–1.9 | 0.25–0.5 | 22–30 | 2–14 | — | — | — |
| Aqualon | Culminal MHEC 40k Pl | 65,000 cps (2% Brookfield) | N | — | 1.6–1.9 | 0.25–0.5 | 22–30 | 2–14 | — | — | — |
| | | | | HPMC | | | | | | | |
| Aldrich | 42,317-3 | 100,000 cps (2% Ubbelohde) | N | 120,000 | 1.1–1.6 | 0.1–0.3 | 21 | — | 5 | 25 | 9 |
| Aldrich | 42,318-1 | 15,000 cps (2% Ubbelohde) | N | 90,000 | 1.1–1.6 | 0.1–0.3 | 21 | — | 5 | 25 | 8 |
| Aldrich | 20,032-8 | 4,000 cps (2% Ubbelohde) | N | 86,000 | 1.7–1.9 | 0.1–0.2 | 29 | — | 7 | 30 | 4 |
| Aldrich | 42,320-3 | 4,000 cps (2% Ubbelohde) | N | 86,000 | 1.8–2.0 | 0.2–0.3 | 29 | — | 7 | 32 | 8 |
| Aldrich | 29,441-1 | 80–120 cps (2% Ubbelohde) | N | 12,000 | 1.1–1.6 | 0.1–0.3 | 21 | — | 5 | 25 | 7 |
| Aldrich | 42,321-1 | 50 cps (2% Ubbelohde) | N | 11,500 | 1.8–2.0 | 0.2–0.3 | 29 | — | 7 | 32 | 7 |
| Aldrich | 42,323-8 | 6 cps (2% Ubbelohde) | N | 10,000 | 1.8–2.0 | 0.2–0.3 | 29 | — | 7 | 29 | 6 |
| Aldrich | 44,275-5 | 5 cps (2% Ubbelohde) | N | 10,000 | 1.8–2.0 | 0.2–0.3 | 29 | — | 9 | 32 | 7 |
| Dow | Methocel K15M | 11,000 (2% Brookfield)/15,000 (2% Ubbelohde) | N | — | 1.4 | 0.21 | 22 | — | 8 | 23 | 3 |
| Dow | Methocel F4M | 3,800 (2% Brookfield)/4,000 (2% Ubbelohde) | N | — | 1.8 | 0.13 | 28 | — | 5 | 31 | 4 |
| Dow | Methocel 240 | 22,000 (2% Brookfield)/40,000 (2% Ubbelohde) | N | — | — | — | — | — | — | 31 | 4 |
| Dow | Methocel J5MS | 3,800 (2% Brookfield)/4,000 (2% Ubbelohde) | Y | — | — | — | 18 | — | 27 | 21 | 15 |
| Dow | Methocel J40MS | 22,000 (2% Brookfield)/40,000 (2% Ubbelohde) | Y | — | — | — | 18 | — | 27 | 20 | 13 |
| Aqualon | Culminal MHPC 45k Pl | 65,000 cps (2% Brookfield)? | N | — | 1.6–1.9 | 0.2–0.4 | 20–30 | — | 2–25 | 32 | 2 |
| Aqualon | Culminal C4046 | 65,000–86,000 cps (2% Brookfield)? | Y | — | — | — | 20–30 | — | 2–25 | 27 | 2 |
| Aqualon | Culminal MHPC 1034 | 22,000 (2% Brookfield)? | N | — | 1.6–1.9 | 0.4–0.8 | 20–30 | — | 2–25 | 23 | 4 |
| | | | | MC | | | | | | | |
| Aldrich | 27,441-0 | 4,000 cps (visc. type?) | N | 86,000 | 1.6–1.9 | — | 27.5–31.5 | — | — | 33 | 0 |
| Aldrich | 27,442-9 | 400 cps (visc. type?) | N | 40,000 | 1.6–1.9 | — | 27.5–31.5 | — | — | 28 | 0 |
| Aldrich | 27,443-7 | 1,500 cps (visc. type?) | N | 63,000 | — | — | — | — | — | 34 | 0.1 |
| Aldrich | 18,804-2 | 25 cps (visc. type?) | N | 17,000 | — | — | — | — | — | 32 | 0 |
| Aldrich | 27,444-5 | 15 cps (visc. type?) | N | 14,000 | 1.6–1.9 | — | 27.5–31.5 | — | — | 31 | 0 |

TABLE 2

Correlation constants

HPMC NP index

| A1 | A2 | A3 | A4 | A5 | X1 | X2 |
|---|---|---|---|---|---|---|
| 2.957E+00 | −5.661 E−01 | −1.950E−02 | 4.112E−06 | 7.125E−01 | 4.902E−01 | 1.548E−01 |

| | X3 | X4 | X5 | X6 | X7 | X8 |
|---|---|---|---|---|---|---|
| | 1.246E−01 | 6.088E−01 | −7.636E−01 | 1.201E+00 | 3.078E+00 | −5.912E−01 |

MC NP index

| B1 | B2 | B3 | B4 | Y1 | Y2 | Y3 |
|---|---|---|---|---|---|---|
| −1.055E+01 | 3.695E−04 | 1.342E+01 | 1.168E+00 | 9.974E−01 | 1.182E+01 | −1.367E+00 |

| | | | | Y4 | Y5 | Y6 |
|---|---|---|---|---|---|---|
| | | | | 9.805E−01 | −7.942E−02 | 6.035E−02 |

TABLE 2-continued

Correlation constants

MC TPB index

| C1 | C2 | C3 | C4 | C5 | Z1 | Z2 |
|---|---|---|---|---|---|---|
| −7.010E+01 | 6.888E+00 | 3.307E+01 | 4.824E+01 | 2.120E+00 | 2.781E−02 | −1.956E−01 |

| Z3 | Z4 | Z5 | Z6 | Z7 | Z8 |
|---|---|---|---|---|---|
| −2.284E−01 | −1.190E−01 | −3.683E−01 | 9.072E−02 | 2.629E−02 | 3.841E−02 |

What is claimed is:

1. A reinforced wallboard core comprising:
water; and
dry ingredients, wherein the dry ingredients comprise β-calcium sulfate hemihydrate powder and a powdered additive and the dry ingredients are mixed together and mixed with the water, forming a slurry and hydrating the β-calcium sulfate hemihydrate powder, wherein the powdered additive is of a cellulose ether other than CMC, and the cellulose ether is selected to have both a viscosity grade of at least about 100 cps and a molecular weight of at least about 20,000, the average density of the wallboard core being less than 0.8 g/cc, when dried.

2. The wallboard core of claim 1, wherein the cellulose ether is a HPC, a HEC, a MC, a HPMC, a EHEC, a EHPC or a HEMC.

3. The wallboard core of claim 1, wherein the cellulose ether is a HPMC.

4. The wallboard core of claim 1, wherein the cellulose ether is a HEMC.

5. The wallboard core of claim 1, wherein the cellulose ether is a HEC.

6. The wallboard core of claim 1, wherein the wallboard core comprises substantially no clay.

7. The wallboard core of claim 4, wherein the wallboard core comprises substantially no clay.

8. The wallboard core of claim 1, wherein the cellulose ether is a MC.

9. The wallboard core of claim 8, wherein the MC is selected to have a viscosity grade of at least about 400 cps.

10. The wallboard core of claim 1, wherein the amount of water to dry ingredients is selected such that the average density of the wallboard core is less than 0.75 g/cc.

11. The wallboard core of claim 10, wherein the mixing causes dispersion of the powdered additive throughout the β-calcium sulfate hemihydrate powder, whereby the powdered additive is evenly dispersed in the wallboard core.

12. The wallboard core of claim 10, wherein the density of the wallboard core is in a range from 0.45 g/cc to 0.7 g/cc.

13. The wallboard core of claim 1, wherein the percent weight of additive to the β-calcium sulfate hemihydrate powder is at least 0.5 wt %.

14. The wallboard core of claim 13, wherein the additive is selected, and the amount of additive is selected, such that an addition of additive continuously increases the nail pull resistance of the wallboard core.

15. The wallboard core of claim 13, wherein the percent weight of additive to the β-calcium sulfate hemihydrate powder is selected to be no greater than 3 wt %.

16. The wallboard core of claim 1, wherein the degree of substitution of the cellulose ether is less than 1.8.

17. The wallboard core of claim 1, wherein the additive is surface treated to delay dissolution.

18. A wallboard core comprising a β-calcium sulfate hemihydrate powder and an aqueous additive solution, wherein the β-calcium sulfate hemihydrate powder is mixed with the aqueous solution, forming a slurry and hydrating the β-calcium sulfate hemihydrate powder, wherein the aqueous additive solution comprises water and an additive dissolved in the water and the additive is of a cellulose ether other than CMC, and the cellulose ether is selected to have both a viscosity grade of at least about 100 cps and a molecular weight of at least about 20,000, the amount of water being selected such that the wallboard core has a density less than 0.8 g/cc.

19. The wallboard core of claim 18, wherein the cellulose ether is a HEC, a MC, a HPMC, a EHEC, a EHPC or a HEMC, and the cellulose ether is selected to have a viscosity grade of at least about 400 cps.

20. The wallboard core of claim 18, wherein the cellulose ether is a HPMC.

21. The wallboard core of claim 18, wherein the cellulose ether is a HEMC.

22. The wallboard core of claim 18, wherein the cellulose ether is a HEC.

23. The wallboard core of claim 18, wherein the wallboard has a density in a range from 0.4 g/cc to 0.7 g/cc.

24. The wallboard core of claim 18, wherein the wallboard comprises substantially no clay.

25. The wallboard core of claim 18, wherein the cellulose ether is a MC having a viscosity grade of at least about 400 cps.

26. The wallboard core of claim 25, wherein the MC has a molecular weight of at least about 40,000.

27. The wallboard core of claim 25, wherein the amount of water is selected such that the wallboard core has a density less than 0.75 g/cc.

28. The wallboard core of claim 18, wherein the cellulose ether is selected to have a viscosity grade less than about 100,000 cps.

29. The wallboard core of claim 18, wherein the percent weight of additive to the β-calcium sulfate hemihydrate powder is at least 0.5 wt %.

30. The wallboard core of claim 29, wherein the additive is selected, and the amount of additive is selected, such that an addition of additional additive continuously increases the nail pull resistance of the wallboard core.

31. The wallboard core of claim 29, wherein the percent weight of additive to the β-calcium sulfate hemihydrate powder is selected to be no greater than 3 wt %.

32. The wallboard core of claim 31, wherein the additive is selected, and the amount of additive is selected, such that an addition of additional additive continuously increases the nail pull resistance of the wallboard core.

33. A wallboard comprising the wallboard core of claim 1 and at least one face sheet.

34. The wallboard of claim 33, wherein the at least one face sheet is paper.

35. The wallboard of claim 34, wherein the paper is fiber reinforced.

36. The wallboard of claim 33, wherein the at least one face sheet is a polymer layer.

37. The wallboard of claim 36, wherein the polymer layer is formed in situ.

38. The wallboard of claim 33, wherein the at least one face sheet is decorative.

39. A process for making a wallboard core comprising:
mixing together a β-calcium sulfate hemihydrate powder and a powdered additive, until the powdered additive is dispersed throughout the β-calcium sulfate hemihydrate powder, wherein the powdered additive is a cellulose ether other than CMC and the cellulose ether has a molecular weight of at least about 20,000 and a viscosity grade of at least about 200 cps;
adding the mixture of the β-calcium sulfate hemihydrate powder and the powdered additive with an amount of water such that the resulting wallboard core has a density less than 0.8 g/cc;
forming a slurry by mixing the mixture of the β-calcium sulfate hemihydrate powder and the powdered additive with the water;
extruding the slurry;
shaping the extrudate into an elongated sheet; and
allowing the slurry to set, wherein at least a portion of the β-calcium sulfate
hemihydrate powder is hydrated.

40. The process of claim 39, wherein the steps of adding, forming and extruding are continuous.

41. A process for making a wallboard core comprising:
dissolving an additive in water to form an aqueous solution, wherein the additive is a cellulose ether other than CMC and the cellulose ether has a molecular weight of at least about 20,000 and a viscosity grade of at least about 200 cps;
adding an amount of dry ingredients to an amount of the aqueous solution such that the resulting wallboard has a density less than 0.8 g/cc, wherein the dry ingredients include a β-calcium sulfate hemihydrate powder;
forming a slurry by mixing the mixture of the β-calcium sulfate hemihydrate powder and the powdered additive with the water;
extruding the slurry;
shaping the extrudate into an elongated sheet; and
allowing the slurry to set, wherein at least a portion of the β-calcium sulfate hemihydrate powder is hydrated.

42. The process of claim 41, wherein the steps of adding, forming and extruding are continuous.

43. The wallboard core of claim 1, wherein the cellulose ether is selected to have both a viscosity grade of at least about 400 cps and a molecular weight of at least about 40,000.

44. The wallboard core of claim 43, wherein the percent weight of cellulose ether to β-calcium sulfate hemihydrate is at least 0.5 wt %.

45. The wallboard core of claim 44, wherein the percent weight fraction of cellulose ether to β-calcium sulfate hemihydrate is less than 3 wt %.

46. The wallboard of claim 33, wherein the at least one face sheet is a glass mat.

47. The wallboard of claim 33, wherein the density of the wallboard is in a range from 0.45 g/cc to 0.7 g/cc.

48. The wallboard core of claim 1, further comprising a fiber reinforcement, wherein the fiber reinforcement is mixed with the dry ingredients.

49. The wallboard core of claim 48, wherein the fiber reinforcement is a cellulose fiber.

50. The wallboard core of claim 48, wherein the fiber reinforcement is one of a glass fiber, a polymer fiber and a carbon fiber.

51. The wallboard core of claim 48, wherein the fiber reinforcement is one of a polyester fiber and a nylon fiber.

52. The wallboard core of claim 48, wherein the fiber reinforcement has an elongated axis and the elongated axis is oriented in the direction of extrusion.

53. The wallboard core of claim 1, wherein the surface of the wallboard core resists the development of mold, showing no signs of mold growth after 24 days of exposure to mold spores within an environment maintained at 90% humidity and a temperature of 32° C.

54. The wallboard of claim 33, wherein the surface of the wallboard resists the development of mold, showing no signs of mold growth after 24 days of exposure to mold spores within an environment maintained at 90% humidity and a temperature of 32° C.

55. A reinforced wallboard core comprising:
water; and
dry ingredients, wherein the dry ingredients comprise β-calcium sulfate hemihydrate powder and a powdered additive and the dry ingredients are mixed together and mixed with the water, forming a slurry and hydrating the β-calcium sulfate hemihydrate powder, wherein the powdered additive is of a methyl cellulose, having a degree of substitution in a range from 1.2 to 1.6, the average density of the wallboard core being less than 0.8 g/cc, when dried.

* * * * *